(12) United States Patent
Ohno et al.

(10) Patent No.: US 6,177,166 B1
(45) Date of Patent: Jan. 23, 2001

(54) OPTICAL INFORMATION RECORDING MEDIUM

(75) Inventors: Takashi Ohno, Yokohama (JP); Masao Komatsu, Jurong (SG); Natsuko Nobukuni, Yokohama (JP)

(73) Assignee: Mitsubishi Chemical Corporation, Tokyo (JP)

( * ) Notice: Under 35 U.S.C. 154(b), the term of this patent shall be extended for 0 days.

(21) Appl. No.: 09/192,321

(22) Filed: Nov. 16, 1998

(30) Foreign Application Priority Data

Nov. 17, 1997 (JP) .................................................. 9-314914
Nov. 20, 1997 (JP) .................................................. 9-319550

(51) Int. Cl.$^7$ ........................................................... B32B 3/02
(52) U.S. Cl. ........................ 428/64.1; 428/64.4; 428/64.5; 428/64.6; 428/457; 428/913; 430/270.13; 430/495.1; 430/945; 369/283; 369/288
(58) Field of Search ................................ 428/64.1, 64.2, 428/64.4, 64.5, 64.6, 457, 913; 430/270.13, 495.1, 945; 369/283, 288

(56) References Cited

FOREIGN PATENT DOCUMENTS

| | | |
|---|---|---|
| 0 683 485 | 11/1995 | (EP) . |
| 0 779 614 | 6/1997 | (EP) . |
| 0 844 607 | 5/1998 | (EP) . |
| 0 867 868 | 9/1998 | (EP) . |
| 5-81719 | 4/1993 | (JP) . |
| 7-57301 | 3/1995 | (JP) . |
| 10-228676 | 8/1998 | (JP) . |

Primary Examiner—Elizabeth Evans
(74) Attorney, Agent, or Firm—Oblon, Spivak, McClelland, Maier & Neustadt, P.C.

(57) ABSTRACT

An optical information recording medium comprising a substrate, a recording layer, a protective layer containing a sulfur atom, an intermediate layer in contact with the protective layer and a reflective layer containing silver as the main component in contact with the intermediate layer, wherein the intermediate layer comprises an element which does not form a compound with silver, the element contained in the intermediate layer having a solid solubility of at most 5 atomic % to silver and silver having a solid solubility of at most 5 atomic % to the element contained in the intermediate layer, on the side in contact with the reflective layer, and the intermediate layer comprises an element less reactive to sulfur or its sulfide comprises chemically stable elements, on the side in contact with the protective layer.

30 Claims, 9 Drawing Sheets

OPTICAL INFORMATION RECORDING MEDIUM

The present invention relates to an optical information recording medium such as a phase-change type recording medium and a magneto-optical medium.

Along with an increasing amount of information in recent years, a recording medium capable of recording and retrieving a large amount of data at a high density and at a high speed has been demanded, and an optical disk is expected to be just suitable for such an application.

Optical disks are classified into a write-once type disk which is capable of recording only once and a rewritable type disk which is capable of recording and erasing for any number of times. As a rewritable type optical disk, a magneto-optical medium utilizing a magneto-optical effect or a phase-change medium utilizing the change in reversible change in the crystal and/or amorphous state, may be mentioned.

The phase-change medium has a merit that it is capable of recording/erasing simply by modulating the power of a laser beam without requiring an external magnetic field, and the size of a recording and retrieving device can be made small and simple.

Further, it has a merit that a high density recording can be attained by a shorter wavelength light source without any particular alteration of the material of e.g. the recording layer from the medium capable of recording/erasing with a wavelength of about 800 nm, which is currently mainly used.

As the material for the recording layer of such a phase-change medium, a thin film of a chalcogenide alloy is often used. For example, an ally of GeSbTe type, InSbTe type, GeSnTe type or AgInSbTe type may be mentioned. Its layer structure is generally a quadri-layer structure comprising a protective layer, a recording layer, a protective layer and a reflective layer.

In a rewritable phase-change type recording medium which is practically employed at present, a crystal state is an unrecorded or erased state, and an amorphous state is a recorded state.

The recording, i.e. formation of the amorphous marks, is carried out by heating the recording layer to a temperature higher than the melting point, followed by quenching. The erasing, i.e. crystallization, is carried out by heating the recording layer to a temperature higher than the crystallization temperature of the recording layer but lower than the melting point.

To prevent evaporation or deformation of the recording layer by such heating or quenching treatment, it is common to sandwich the recording layer with heat resistant and chemically stable dielectric protective layers. In the recording step, these protective layers facilitate heat dissipation from the recording layer to realize supercooled state, and thus contribute to formation of the amorphous marks, and in the erasing step, the protective layers work as heat-accumulating layers to maintain the recording layer at a high temperature suitable for solid phase crystallization.

Further, it is common that a metal reflective layer is formed on the above described sandwich structure to obtain a quadri-layer structure, whereby the heat dissipation is further facilitated so that the amorphous marks will be formed under a stabilized condition.

A phase-change type recording medium one-beam overwritable simply by modulating an intensity of one focused laser beam is erasing and re-recording steps, is noteworthy as a medium for an inexpensive recording system of high density and large capacity since a layer structure and a drive circuit structure can be simplified.

Recently, a CD (Compact Disk) or DVD (Digital Versatile Disk, or Digital Video Disk) has been developed by using such a phase-change type recording medium.

A rewritable CD (CD-Rewritable, CD-RW) does not satisfy the standard of present CD requiring a reflectance of at least 70%, but secures a compatibility of groove signals and recording signals to CD in a reflectance range of from 15 to 25%. Also, if an amplification system is applied to a regeneration system in order to cover the low reflectance, a compatibility can be secured within the scope of present CD driving techniques.

CD-RW is provided with a wobbling groove, in which recording is carried out. The wobbling frequency is one having a carrier frequency of 22.05 kHz frequency-modulated (FM) by address information. Its wobble amplitude is very small (about 30 nm) in comparison with a groove pitch (1.6 nm).

This is called as ATIP (Absolute Time In Pre-groove) signal wherein wobbling is frequency-modulated and address information of a certain track at a specific position is introduced.

ATIP signal is already used in a write once type disk (CD-recordable, CD-R) with an organic dye. By using ATIP signal, it becomes possible to control the rotational speed of an unrecorded disk, and recording can be carried out at a linear velocity of 1, 2 or as high as 4 or 6 times of the CD linear velocity (from 1.2 to 1.4 m/s).

Actually, a commercially available CD-R is generally a medium satisfactorily recordable at a linear velocity of either 2 or 4 times of the CD linear velocity.

Thus, it is demanded also with regard to phase-change recording CD-RW that is satisfactorily overwritable at a linear velocity in the range of at least 2 times (2.4–2.8 m/s) to 4 times (4.8 m/s–5.6 m/s), further in the range of 6 times (7.2–8.4 m/s) to 8 times (9.6–11.2 m/s) of the CD linear velocity.

On the other hand, a rewritable recording medium having a higher recording density, i.e. a rewritable DVD, has been developed by using such a phase-change recording technology. And also in this case, it is demanded that the rewritable DVD is satisfactorily overwritable at a linear velocity in the range of at least 2 times (7 m/s) and even to 4 times (14 m/s) of the read-only DVD linear velocity (3.5 m/s).

In such a case, in order to use an inexpensive semiconductor laser, it is desirable that the recording power is at most about 15 mW, and even if the linear velocity during recording is different, a desired or the same mark length must be recorded with high quality, simply by changing the reference clock frequency in inverse proportion to the linear velocity.

However, with a phase-change medium, if the ratio of the maximum linear velocity to the minimum linear velocity for overwriting exceeds about 2, it becomes impossible to carry out proper recording at either linear velocity, in many cases.

Usually, a recordable disk requires a different irradiation power to heat the recording layer to the same temperature for the different linear velocity. Even if the maximum temperature of the recording layer is brought to the same level by adjusting the irradiation power, if the linear velocity is different, the same heat history including temperature rising rate, cooling rate and temperature distribution may not necessarily be accomplished.

Formation of amorphous marks during recording is carried out by quenching the recording layer which has once been melted by heating, at least a specific critical cooling rate, and crystallization during erasing is carried out by relatively slowly cooling the heated recording layer. This cooling rate depends on the linear velocity when the same layer structure is employed. Namely, at a high linear velocity, the cooling rate is high, and at a low linear velocity, the cooling rate is low.

Thus, as a linear velocity during overwriting becomes higher, a cooling rate in the vicinity of a melting point becomes higher and amorphous marks are easily formed. On the contrary, as the linear velocity becomes lower, the cooling rate becomes lower and there is a fear that recrystallization during recording tends to occur.

This is proved by the following simulation results made by the present inventors.

Heat distribution simulation was carried out by solving a thermal diffusion equation when applying with recording power and erase power with regard to a disk having a protective layer (100 nm) comprising ZnS and $SiO_2$, a recording layer (25 nm) comprising $Ge_2Sb_2Te_5$, a protective layer (20 nm) comprising ZnS and $SiO_2$ and a reflective layer (100 nm) comprising Al alloy respectively formed on a polycarbonate substrate.

A cooling rate in the vicinity of a melting point (600° C.) was estimated at a position of 0.1 $\mu$m from the pulse irradiation-initiating point during the temperature-descending process after reaching the maximum temperature (1350° C.) by heating a recording layer, and the calculated results were 0.9 K/nsec at a linear velocity of 1.4 m/s, 2.2 K/nsec at a linear velocity of 4 m/s and at least several K/nsec at a linear velocity of at least 10 m/s.

On the other hand, to erase the amorphous marks during erasing, it is necessary to maintain the recording layer at a temperature higher than the crystallization temperature and lower than the melting point or its vicinity for a certain period. Accordingly, if a laser beam irradiation for overwriting is carried out under a relatively high linear velocity, the heat distribution at the irradiated portion of the recording layer becomes relatively rapid timewise and spatially, whereby there will be a problem that during erasing, crystallization tends to be insufficient and a non-erased portion may remain.

To cope with such a recording condition, an alloy with a composition having a relatively high recrystallization ability may be used for the recording layer, or a layered structure whereby heat is hardly dissipated, may be employed for the recording layer, so that crystallization i.e. erasing of amorphous marks can be completed in a relatively short period of time. On the contrary, under a relatively low linear velocity recording condition, the cooling rate tends to be low as described above, whereby recrystallization during amorphous mark formation is feared. As a method for preventing recrystallization during amorphous mark formation, an alloy with a composition having a relatively slow recrystallization ability may be employed, or a layer structure whereby heat is readily dissipated, may be employed for the recording layer. That is, two kinds of media must be prepared depending on a linear velocity.

However, with e.g. CD-RW or a rewritable DVD, it is not preferred that separate disks have to be prepared for recording at 2- and 4-times velocities of CD or DVD.

In order to solve this problem, with regard to a phase-change type recording medium having a GeTe—$Sb_2Te_2$ pseudo-binary alloy type recording layer, there have been some reports including one by the present inventors with respect to a method for obtaining good overwriting characteristics within a linear velocity range of from about 1 m/s to about 10 m/s by changing the pulse strategy during overwriting (a system for controlling by dividing the irradiation beam into pulses to obtain a good pit shape) depending upon the linear velocity.

However, generally, to implement a variable pulse strategy makes the pulse generation and laser driving circuit, etc. complicated, thus leading to an increase of the cost for producing the drive. Accordingly, it is desirable that a wide range of the linear velocity can be covered simply by changing the reference data clock period with the same pulse strategy i.e. without changing the pulse strategy, or the least changing the pulse strategy.

In order to solve these problems, the present inventors have proposed to use a reflective layer having a specific film thickness and volume resistivity, particularly to use a reflective layer mainly comprising silver or gold (see U.S. patent application Ser. No. 09/048,042).

It is preferable to use a reflective layer comprising a material such as silver which is a metal having a high reflectance and a high thermal conductivity since it assures an optical interference effect and also assures a heat dissipation effect. Particularly, silver is the metal of the highest thermal conductivity and, therefore, relatively thin silver layer of less than 100 nm thickness has enough heat dissipating effect. Moreover, silver is preferable since it is easily formed into a film and it is preferable from economical viewpoint.

However, the present inventors have further studied and found that gold and silver do not have a satisfactory adhesion to a dielectric material, and also that since silver is corroded with sulfur, a protective layer containing sulfur causes a problem.

Also, the present inventors have proposed a multi-layered reflective layer comprising a first reflective layer comprising aluminum alloy provided on a protective layer and a second reflective layer comprising silver provided thereon in the above-mentioned U.S. patent application. However, in such a case, it has been found that mutual atomic diffusion between aluminum and silver is caused and consequently that a storage stability is poor and recording can not properly be made when stored at a high temperature under a high humidity although a satisfactory recording property can be obtained immediately after forming a film.

That is, when using a material comprising silver as the main component is used as a reflective layer, a storage stability is unsatisfactory, and a recording sensitivity, a recording signal intensity or the like is changed when recording is carried out after storing a medium under a severe environment for a long term.

The present invention has been made for solving the above-mentioned problems, and an object of the present invention is to provide an optical information recording medium having satisfactory disk properties in a wide linear velocity range and in a wide irradiation power range. Also, another object of the present invention is to provide an optical information recording medium excellent in storage stability.

The essential features of the present invention reside in an optical information recording medium comprising a substrate, a recording layer, a protective layer containing a sulfur atom, an intermediate layer in contact with the protective layer and a reflective layer containing silver as the main component in contact with the intermediate layer, wherein the intermediate layer comprises an element which does not form a compound with silver, the element contained in the intermediate layer having a solid solubility of at most 5 atomic % to silver and silver having a solid solubility of at most 5 atomic % to the element contained in the intermediate layer, on the side in contact with the reflective layer, and the intermediate layer comprises an element less reactive to sulfur or its sulfide comprises chemically stable elements, on the side in contact with the protective layer, and further reside in an optical information recording medium comprising a substrate, a recording layer, a protective layer containing a sulfur atom, an intermediate layer in contact with the protective layer and a reflective layer containing silver as the main component in contact with the intermediate layer, wherein the intermediate layer comprises an element which forms a continuous series of solid solutions with silver, and still further reside in an optical information recording medium comprising a substrate, a recording layer, a protective layer containing a sulfur atom, an intermediate layer in contact with the protective layer and a reflective layer containing silver as the main component in contact with the intermediate layer, wherein the intermediate layer comprises amorphous carbon or an oxide, a nitride or a carbide of a semiconductor or metal.

Figure 1:
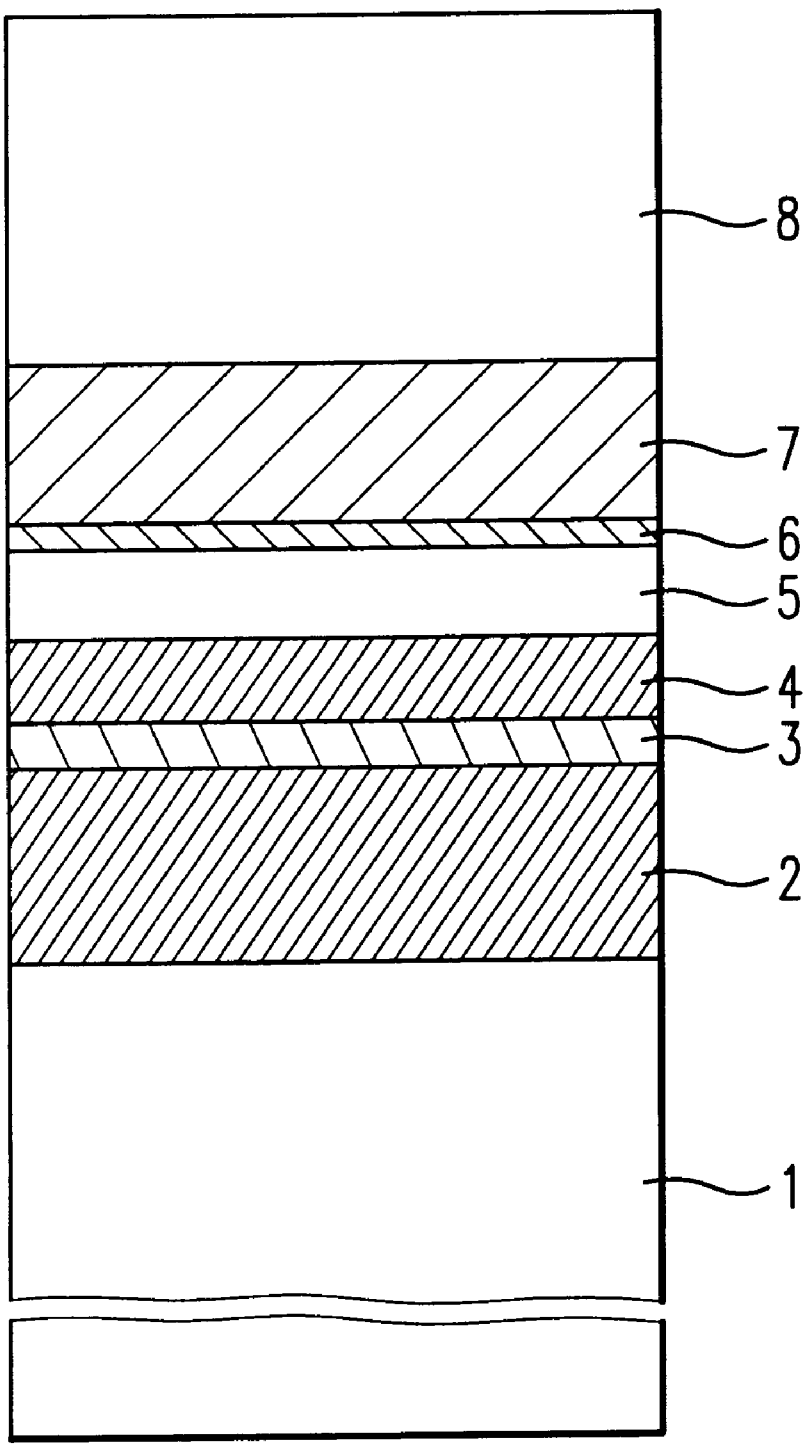
FIG. 1 illustrates an example of an optical information recording medium of the present invention, wherein 1 is a substrate, 2 is a lower protective layer, 3 is a phase-change type recording layer, 4 is an upper protective layer, 5 is a first reflective layer, 6 is a diffusion-preventing layer, 7 is a second reflective layer and 8 is a protective coating.

The present inventors have found that a medium using a combination of a protective layer containing a sulfur atom and a reflective layer containing silver as the main component is remarkably deteriorated after repetitive overwriting or storing for a long time although its initial properties are satisfactory, and consequently that it is hard to practically use as it is.

Also, the present inventors have found that if a layer containing aluminum as the main component is provided as an intermediate layer between a protective layer containing a sulfur atom and a reflective layer containing a silver as the main component, its storage stability is poor and it is remarkably deteriorated by environmental resistance test although its initial properties are satisfactory, and consequently it is not suitable for practical use.

Accordingly, the present inventors have variously studied with regard to an intermediate layer provided between a protective layer containing a sulfur atom and a reflective layer containing silver as the main component, and have discovered that a practical medium excellent in storage stability and repetitive recording properties can be provided when the intermediate layer satisfies specific requirements. The present invention has been accomplished on the basis of this discovery.

In the present invention, the intermediate layer comprises an element which does not form a compound with silver, the element contained in the intermediate layer having a solid solubility of at most 5 atomic % to silver and silver having a solid solubility of at most 5 atomic % to the element contained in the intermediate layer, on the side in contact with the reflective layer, and the intermediate layer comprises an element less reactive to sulfur or its sulfide comprises chemically stable elements on the side in contact with the protective layer. Alternatively, the intermediate layer comprises an element which forms a continuous series of solid solutions with silver, or comprises amorphous carbon or an oxide, a nitride or a carbide of a semiconductor or metal.

East Germany Patent Number 98782 discloses a magneto-optical recording medium having a ZnS layer, a ferromagnetic MnBi layer, a ZnS layer and a silver layer laminated on a glass substrate, but discloses nothing about the above-mentioned problems concerning repetitive overwriting properties and storage stability caused by the combination use of a protective layer containing a sulfur atom and a reflective layer containing silver as the main component, and does not disclose nor suggests that the above-mentioned problems can be solved by providing an intermediate layer satisfying the above-mentioned specific requirements.

JP-A-8-329525 discloses a phase-change type recording medium having an $Au_{50}Ag_{50}$ reflective layer, a $(ZnS)_{80}(SiO_2)_{20}$ protective layer, a $(Ge_2Sb_2Te_5)_{90}(Cr_4Te_5)_{10}$ recording layer, a $(ZnS)_{80}(SiO_2)_{20}$ protective layer, a Si first reflective layer and an $Al_{97}Ti_3$ second reflective layer laminated on a polycarbonate substrate, and Al, Au, Cu, Pt, Pd, Sb—Bi and their alloys, together with Ag and its alloy, are illustrated as the first/second reflective layer materials. However, this reference discloses nothing about the problem concerning repetitive overwriting properties and storage stability caused by the combination use of a protective layer containing a sulfur atom and a reflective layer containing silver as the main component, and does not disclose nor suggests to solve the above-mentioned problems by providing an intermediate layer satisfying the above-mentioned specific requirements.

JP-A-9-185846 discloses a phase-change type recording medium having a $(ZnS)_{80}(SiO_2)_{20}$ protective layer, a $(Cr_4Te_5)_7(Ge_2Sb_2Te_5)_{93}$ recording layer, a $(ZnS)_{80}(SiO_2)_{20}$ protective layer, a Si first reflective layer, a tungsten diffusion-preventing layer and an $Al_{97}Ti_3$ second reflective layer laminated on a polycarbonate substrate, and Al, Au, Cu, Mo, Ta, W, Co, Pt and their alloys, together with Ag and its alloy, are illustrated as the first/second reflective layer materials, but this is merely one example among many elements. Thus, this reference does not disclose to use a material containing silver as the main component for a reflective layer and its utility. Further, as a matter of fact, this reference discloses nothing about the problem concerning repetitive recording properties and storage stability caused by the combination use of a protective layer containing a sulfur atom and a reflective layer containing silver as the main component, and does not disclose nor suggests that the problems can be solved by providing an intermediate layer satisfying the above-mentioned specific requirements.

The optical information recording medium of the present invention can be used as a medium for various recording systems such as a magneto-optical recording medium, a phase-change type recording medium and the like, but is used preferably for a phase-change type recording medium, particularly a phase-change type recording medium utilizing a reflectance difference between a crystalline state and an amorphous state.

Hereinafter, the present invention is described with regard to a preferable phase-change type recording medium in more details.

Most of conventional phase-change type optical disks have a protective layer, a recording layer, a protective layer and a reflective layer provided on a substrate in this order mainly by sputtering method, and a UV ray-curable resin layer is further provided thereon. The reflective layer is provided for the purposes of positively utilizing an optical interference effect to enlarge a signal amplitude and also working as a heat-dissipation layer, and in the case of a phase-change type recording medium, the reflective layer has a function of producing a super-cooled state necessary for the formation of amorphous marks. For this purposes, a metal having a high reflectance and a high thermal conductivity is generally used as the reflective layer, examples of which include Au, Ag, Al and the like.

In view of economical aspect and easy film-formation, Ag is preferable. Ag is relatively cheap as a sputtering target, and provides a stable discharge, a high film-forming speed and a high stability in air and also provides excellent properties in respect of reflectance and thermal conductivity. Also, the same effect can be expected with regard to a system having a small amount of impurities mixed with Ag. However, some films provided in contact with Ag have a bad interference to Ag. For example, when a layer containing such an element as to be easily diffused into the Ag film is provided in contact with Ag, a heat conductivity is largely reduced by undesirable alloying. In such a case, when a signal is newly recorded, due to a heat distribution difference at the time of recording, a recording sensitivity is changed, or signal properties becomes worse since marks are not clearly formed. These phenomena are not preferable.

Thus, in the case of a conventional phase-change optical disk, it is general to use an Al alloy having Ta, Ti, Cr, Mo, Mg, Zr, V, Nb or the like added in an amount of from 0.5 to 5 atomic % as a reflective layer without using Ag. However, even in such a case, the same phenomena as mentioned above occur after storing under severe environment, since such an Al alloy probably causes a segregation of compounds of Al and additive element, resulting in a change in reflectivity and thermal conductivity.

When the recording layer comprises an alloy thin film of $Ma_w(Sb_zTe_{1-z})_{1-w}$ wherein $0 \leq w \leq 0.3$, $0.5 \leq z \leq 0.9$ and Ma is at least one component selected from the group consisting of In, Ga, Zn, Ge, Sn, Si, Cu, Au, Ag, Pd, Pt, Pb, Cr, Co, O, N, S, Se, Ta, Nb, V, Bi, Zr, Ti, Mn, Mo, Rh and a rare earth element), mark shapes are likely to be influenced by a difference in heat distribution.

Examples of an element easily diffusable into Ag include Al, S and the like. Accordingly, in the case of using $ZnS—SiO_2$ often usable for a phase-change type optical disk as a protective layer, when an Ag reflective layer is provided in contact with the $ZnS—SiO_2$ protective layer in the same manner as in the above conventional type structure, recording properties are changed as a lapse of time due to a corrosion of Ag layer. Also, many defects are observed by observation with a microscope on the Ag side, and even in a case of a new disk, recording properties are sometimes deteriorated by repeated overwriting about 100 to 1000 times, and the disk becomes useless.

Therefore, the present inventors have proposed to provide an intermediate layer which prevents diffusion from a protective layer to a reflective layer containing Ag as the main component which does not cause a practical damage on heat conductivity.

The phase-change type recording medium of the present invention comprises a substrate, a phase-change type recording layer, a protective layer and a reflective layer, and an intermediate layer is provided in contact with the protective layer and the reflective layer. For example, a lower protective layer, a phase-change type recording layer, an upper protective layer, an intermediate layer and a reflective layer are provided on a substrate in this order, or a reflective layer, an intermediate layer, a protective layer, a phase-change type recording layer and a protective layer are provided on a substrate in this order. The above multi-layered structure may be provided on both sides of the substrate.

When the intermediate layer is composed of a specific metal or alloy, the intermediate layer comprises an element which does not form a compound with silver, the element contained in the intermediate layer having a solid solubility of at most 5 atomic % to silver and silver having a solid solubility of at most 5 atomic % to the element contained in the intermediate layer, on the side in contact with the reflective layer, and the intermediate layer comprises an element less reactive to sulfur or its sulfide comprises chemically stable elements on the side in contact with the protective layer.

Thus, the intermediate layer must comprise an element satisfying the above-mentioned specific conditions, and the conditions are determined basically by referring to a binary alloy phase diagram of the element contained in the intermediate layer with silver or sulfur. Such a binary alloy phase diagram is described in "Constitution of Binary Alloys", (Max Hansen and Kurt Anderko, second edition (1985), Genium Publishing Corporation, New York).

Silver is easily diffused into other metal even at a low temperature of less than 100° C., and the formation of a solid solution or a compound due to such a diffusion is not preferable since inherent high reflectivity or high thermal conductivity of silver is degraded. Therefore, the intermediate layer must comprise an element which does not form a solid solution or a compound with silver on the side in contact with the reflective layer.

In the present invention, the condition "an element does not form a solid solution with silver" means that the element does not form a solid solution with silver at all and that both of a solid solubility of the element to silver and a solid solubility of silver to the element are at most 5 atomic % and the element is quite hardly soluble to silver.

The term "solid solubility" refers to the maximum solid solubility in the total temperature range as far as it is a solid state. In the binary alloy phase diagram according to the above Hansen's reference, examples of the element which does not form a solid solution with silver nor forms a compound with silver, include sodium, lead, bismuth, silicon, tantalum, cobalt, chromium, tungsten, vanadium, and the like.

Among them, sodium, lead and bismuth have an eutectic temperature in a relatively low temperature range of at most 500° C., and are therefore relatively thermally unstable. That is, according to the phase diagram, respective eutectic temperatures are sodium (97° C.), lead (304° C.), bismuth (262° C.), silicon (830° C.) and chromium (961° C.).

Detailed phase diagrams are not described with regard to tantalum, cobalt, tungsten and vanadium, but it is known that these elements do not form a compound with silver and that they are substantially insoluble to silver even in a melted state. Nickel has almost no solid solubility to silver, and silver has a slight solid solubility to nickel but its solid solubility is believed much lower than 5 atomic %.

Sodium is not preferable since it is unstable in the atmosphere.

On the other hand, zirconium, magnesium, manganese, indium, titanium, antimony, germanium, tellurium, zinc and the like are not suitable since they form a compound with silver or form a solid solution in a relatively high concentration range. Further, aluminum also forms a solid solution with silver, and it is therefore not preferable as an element for the intermediate layer on the side in contact with silver.

The stability at the interface of a laminated layer of silver and an element (silicon, tantalum, cobalt, chromium, tungsten or vanadium) considered to be preferable according to the above consideration, was confirmed actually by applying an acceleration test under high temperature and humidity to the laminated thin film, and it was also confirmed by measuring a thermal conductivity change by alloy-formation that a heat dissipation effect was not lowered.

Among these elements, tantalum and nickel are most preferable elements since they hardly cause separation due to an internal stress in the film.

However, even an element forming a solid solution with silver is sometimes preferable in the case of forming a continuous series of solid solutions with silver since it does not cause a phase separation and it does not unfavorably affect on a thermal conductivity. Preferable examples of forming a continuous series of solid solutions with silver include gold and palladium.

On the other hand, the intermediate layer comprises an element less reactive with a highly corrosive sulfur, i.e. an element which does not form a compound with sulfur at all in the phase diagram, or an element, the sulfide of which forms a chemically stable passive state at the interface and achieves a diffusion-preventing effect, on the side in contact with the protective layer containing sulfur.

The stability of the sulfide is described in a literature or can be confirmed by measuring thermogravimetric spectrum. According to the above-mentioned Hansen's phase diagram, aluminum is a rare element which does not form a compound with sulfur at all and is most preferable.

It is considered that silicon, tantalum, tungsten, germanium and vanadium respectively form $SiS_2$, $TaS_2$, $WS_2$, $GeS_2$ and $V_2S_3$, but it is a temperature higher than 500° C. at which a thermogravimetric change such as melting, decomposition or sublimation is caused with regard to these compounds.

Cobalt and chromium form many sulfides, but according to the phase diagram, a melting point and a decomposition temperature of these sulfides are higher than 500° C. The stability was experimentally confirmed by forming films of these elements on a $ZnS:SiO_2$ protective layer, and according to the experimental results, corrosion was not caused at least by sulfide-formation reaction and a reflectance did not change.

According to the phase diagram, sulfides of silver and copper such as $Ag_2S$ and $Cu_2S$ are thermally stable, but according to the experimental results, they exhibited some unstability on a $ZnS:SiO_2$ protective layer. In the phase diagram, their solid phases exhibit phase transformation at a temperature higher than 500° C., and it is considered that they are not always stable.

When the intermediate layer comprises a compound, the intermediate layer comprises amorphous carbon or an oxide, a nitride or a carbide of a semiconductor or metal. They are stable compounds. It is preferable that they are heat resistant compounds having a melting point of at least 1000° C. when a recording layer is a phase change medium.

A sulfide is not preferable as an intermediate layer since it is reactive with silver.

The compound intermediate layer preferably comprises a compound transparent to the wavelength of a light source used for light recording or retrieving since inherent high reflectance of silver can be effectively utilized. In this respect, the amorphous carbon is preferably hydrogenated amorphous carbon having a high transparency.

The reflective layer contains silver as the main component, and this means that the reflective layer contains silver in an amount of at least 70 atomic %. Preferably, the reflective layer contains silver in an amount of at least 95 atomic %, more preferably at least 98 atomic %. Particularly, the reflective layer comprises pure silver or a silver alloy containing at least one component selected from the group consisting of Ti, V, Ta, Nb, W, Co, Cr, Si, Ge, Sn, Sc, Hf, Pd, Rh, Au, Pt, Mg, Zr, Mo and Mn in an amount of from 0.2 atomic % to 2 atomic %.

Among them, Pd, Mg, and Ti are most preferable.

On the other hand, the protective layer, especially on the recording layer, contains sulfur, and preferably contains a sulfide such as zinc sulfide, tantalum sulfide and a rare earth sulfide.

Specifically, the material is preferably a composite dielectric which contains above described materials alone or its mixture in an amount of from 20 to 90 mol % and one or more heat resistant compounds having a melting point or a decomposition temperature of at least 1000° C., including an oxide, a nitride, a fluoride or a carbide of a metal or a semiconductor.

The intermediate layer has a thickness of generally at least 10 Å, preferably at least 50 Å, but generally at most 1000 Å to make full use of the high heat conductivity of silver reflective layer, preferably at most 500 Å, more preferably at most 200 Å. The intermediate layer comprises one or more layers. Among them, preferable examples of the intermediate layer include the following two embodiments.

Embodiment (1)

Intermediate layer comprising two layers of a layer containing aluminum as the main component and a layer preventing alloy-formation between aluminum and silver, in which the former layer is in contact with a protective layer and the latter layer is in contact with a reflective layer.

Embodiment (2)

Intermediate layer comprises an element which does not form a compound with silver, the element contained in the intermediate layer having a solid solubility of at most 5 atomic % to silver and silver having a solid solubility of at most 5 atomic % to the element contained in the intermediate layer, on the side in contact with the reflective layer, and the element is less reactive to sulfur or its sulfide comprises chemically stable elements on the side in contact with the protective layer. Alternatively, the intermediate layer comprises an element which forms a continuous series of solid solutions with silver, or comprises amorphous carbon or an oxide, a nitride or a carbide of a semiconductor or metal.

The Embodiment (1) is described in more details hereinafter. The Embodiment (1) is expressed generally in the following manner. A first reflective layer, a diffusion-preventing layer and a second reflective layer having a volume resistivity of from 20 nΩ·m to 80 nΩ·m are provided on a protective layer. In this case, the layer containing aluminum as the main component corresponds to the first reflective layer, and the layer of preventing alloy-formation between aluminum and silver corresponds to the diffusion-preventing layer, and the reflective layer containing silver as the component corresponds to the second reflective layer.

The reason why aluminum forming a solid solution with silver is used by providing a diffusion-preventing layer, is described below. An object of the present invention is to provide a stable optical information recording medium by effectively utilizing the inherent high thermal conductivity of silver, but it is preferable for this object that an intermediate layer provided between a protective layer and silver has a high thermal conductivity. Aluminum itself has an inherent high reflectance, and achieves a preferable function as a reflective layer having a high reflectance and a high thermal conductivity to the total intermediate layer and silver reflective layer. Aluminum is the most preferable material excellent in respects of reflectance, thermal conductivity and chemical stability, except for being reactive to silver, and is therefore worthy to be used even by providing a diffusion-preventing layer.

According to this structure, even when an intermediate layer is provided between a protective layer and a reflective layer, a thermal conductivity is not substantially hindered, and a medium having satisfactory disk properties in a wide linear velocity range and in a wide power range and having an excellent storage stability can be obtained, and this is quite preferable for practical use.

Hereinafter, with regard to the Embodiment (1), an explanation is made based on this generalized embodiment.

As shown in FIG. 1, a medium of the Embodiment (1) generally has a structure of substrate 1/lower protective layer 2/phase-change recording layer 3/upper protective layer 4/first reflective layer 5/diffusion-preventing layer 6/second reflective layer 7. Further, it is preferable to have a protective coating layer 8 of UV ray-curable or heat-curable resin coated thereon.

In the Embodiment (1), the material of the phase-change recording layer 3 may be well known conventional ones such as GeSbTe, InSbTe, AgSbTe, AgInSbTe, AgGeSbTe or the like, but preferably an alloy comprising SbTe alloy in the vicinity of $Sb_{70}Te_{30}$ eutectic point as the main component, which is stable in either crystalline or amorphous state and is capable of causing a rapid phase-change between the two states. This material is the most practical material which hardly causes segregation when carrying out repetitive overwriting. Specifically, $Ma_w(Sb_zTe_{1-z})_{1-w}$ alloy (wherein $0 \leq w \leq 0.3$, $0.5 \leq z \leq 0.9$ and Ma is at least one component selected from the group consisting of In, Ga, Zn, Ge, Sn, Si, Cu, Au, Ag, Pd, Pt, Pb, Cr, Co, O, N, S, Se, Ta, Nb, V, Bi, Zr, Ti, Mn, Mo, Rh and a rare earth element) is preferable, and more preferably $0 \leq w \leq 0.2$ and $0.6 \leq z \leq 0.8$.

According to the study of the present inventors, a linear velocity dependency is determined by Sb and Te as the main components, and in the vicinity of $Sb_{70}Te_{30}$ eutectic point, a crystallization speed tends to become higher as Sb/Te ratio becomes larger.

A ternary system material having Ge or In added in the vicinity of the eutectic composition is less deteriorated in respect to repetitive overwriting by a specific recording pulse pattern as compared with conventionally well known $GeTe$—$Sb_2Te_3$, $InTe$—$Sb_2Te_3$ pseudo-binary alloy materials, and jitter of mark edge in the case of mark length-recording is small, thus being an excellent material. Further, this material can assure a high crystallization temperature of more than 150° C. and is excellent in archival stability.

This recording layer is usually amorphous in the state immediately after film-formation, and it is therefore preferable to crystallize the whole recording layer surface, thereby making it an initialized state (unrecorded state), as mentioned below.

The Embodiment (1) provides a medium capable of a satisfactory overwriting in a wide linear velocity range, the minimum linear velocity/the maximum linear velocity ratio being at lest two times during overwriting.

More concretely, there is provided a medium capable of a satisfactory overwriting in the range of from 2 times (2.4–2.8 m/s) to 4 times (4.8 m/s–5.6 m/s) of CD linear velocity or of from 1 time (3.5 m/s) to 2 times (7 m/s) of DVD linear velocity.

For this reason, the recording layer composition must have such a high recrystallization ability as to fully erase at about 10 m/s.

As mentioned above, the recording layer of the Embodiment (1) preferably has $Sb_{70}Te_{30}$ eutectic composition as a base, and a linear velocity dependency is influenced by a Sb/Te ratio. Thus, the above recording layer composition is preferably $Ma_w(Sb_zTe_{1-z})_{1-w}$ alloy (wherein $0 \leq w \leq 0.3$, $0.5 \leq z \leq 0.9$, and Ma is at least one component selected from the group consisting of In, Ga, Zn, Ge, Sn, Si, Cu, Au, Ag, Pd, Pt, Pb, Cr, Co, O, N, S, Se, Ta, Nb, V, Bi, Zr, Ti, Mn, Mo, Rh and a rare earth element).

More concretely, a preferably example includes $Mb_{\alpha 1}In_{\beta 1}Sb_{\gamma 1}Te_{\eta 1}$ composition (wherein $0.03 \leq \alpha 1 \leq 0.1$, $0.03 \leq \beta 1 \leq 0.08$, $0.55 \leq \gamma 1 \leq 0.65$, $0.25 \leq \eta 1 \leq 0.35$, $0.06 \leq \alpha 1 + \beta 1 \leq 0.13$, $\alpha 1 + \beta 1 + \gamma 1 + \eta 1 = 1$, and Mb is at least one of Ag and Zn).

A more preferable example includes a composition satisfying $0.03 \leq \alpha 1 \leq 0.1$, $0.05 \leq \beta 1 \leq 0.08$, $0.6 \leq \gamma 1 \leq 0.65$, $0.25 \leq \eta 1 \leq 0.30$, $0.06 \leq \alpha 1 + \beta 1 \leq 0.13$ and $\alpha 1 + \beta 1 + \gamma 1 + \eta 1 = 1$ in the above composition.

In this composition range, a satisfactory erasability of more than 25 dB can be obtained at the time of overwriting at up to 10 m/s. Also, a composition excellent in archival stability can be provided.

In achieves an effect of raising a crystallization temperature and improving an archival stability, and it is preferable to add In in an amount of at least 3 atomic % in order to secure a storage stability at room temperature, but if the amount of In exceeds 8 atomic %, a phase separation tends to occur and segregation tends to occur by repetitive overwriting. Thus, a more referable amount of In is from 5 atomic % to 8 atomic %.

Ag or Zn facilitates initialization of an amorphous film immediately after film-formation. An amount of at most 10 atomic % is almost sufficient for initialization, and if its amount is too large, an archival stability is deteriorated.

Also, if a total amount of Ag or Zn and In exceeds 13 atomic %, a segregation is unpreferably likely to occur at the time of repetitive overwriting.

A preferable other example of the recording layer includes a composition of $Mc_vGe_y(Sb_xTe_{1-x})_{1-y-v}$ (wherein $0.6 \leq x \leq 0.8$, $0.01 \leq y \leq 0.15$, $0 \leq v \leq 0.15$, $0.02 \leq y+v \leq 0.2$ and Mc is at least one of Ag and Zn).

According to this composition, acceleration of precipitation of a low melting metal In and an In-modified alloy in the above MbInSbTe alloy can be improved.

However, on the other hand, initialization process in manufacturing takes unpreferably a long time by the addition of Ge. This unpreferable phenomenon is caused rapidly by the addition of Ge.

In order to improve precipitation of In and to improve retardation of initialization by the addition of Ge, it is preferable to use a composition of $Md_{\alpha 2}In_{\beta 2}Ge_{\delta 2}Sb_{\gamma 2}Te_{\eta 2}$ (wherein $0.01 \leq \alpha 2 \leq 0.1$, $0.001 \leq \beta 2 \leq 0.1$, $0.01 \leq \beta 2 \leq 0.1$, $0.5 \leq \gamma 2 \leq 0.7$, $0.25 \leq \eta 2 \leq 0.4$, $0.03 \leq \beta 2 + \delta 2 \leq 0.15$, $\alpha 2 + \beta 2 + \delta 2 + \gamma 2 + \eta 2 = 1$ and Md is at least one of Ag and Zn).

Generally, a thickness of the phase-change recording layer 3 is preferably in the range of from 10 nm to 100 nm.

If the thickness is smaller than 10 nm, a satisfactory optical contrast is hardly obtainable, and a crystallization speed tends to become low, and erasing in a short time tends to become hard. On the other hand, if the thickness exceeds 100 nm, an optical contrast is also hardly obtainable, and a crack tends to occur.

Particularly, in order to obtain such a satisfactory contrast as to provide a retrieving compatibility with CD or DVD, it is more preferable to use a thickness of from 10 nm to 30 nm. If the thickness is less than 10 nm, a reflectivity becomes too low, and if the thickness exceeds 30 nm, a heat capacity becomes large, and a recording sensitivity tends to become poor.

Plastic deformation by heat cycle during repetitive overwriting tends to be more accumulated as the recording layer is made thicker. From this point of view, it is preferable to use a thickness of at most 30 nm, more preferably at most 25 nm.

As mentioned above, it is preferable to use such a composition of the recording layer as to be suitable for high speed overwriting. If such a composition as to be capable of sufficiently erasable at a high linear velocity is used, the recording layer once melted is easily recrystallized when recording at a low linear velocity, and therefore a satisfactory amorphous mark is hardly formed. Especially to solve this problem, the present invention using a silver based reflective layer is useful.

In conventional GeTe—$Sb_2Te_3$ system, in order to obtain a satisfactory cooling speed of recording layer at a low linear velocity, "rapid cooling structure" wherein the film thickness of upper protective layer 4 is thin, is preferable, and accordingly the film thickness is generally made from 20 nm to 30 nm.

This tendency is expressed, for example, in symposium on phase-change optical recording held every year since 1991 (see the text published by the Society of Applied Physics, the society for the study of phase-change optical recording).

The main reason is to effectively work heat dissipation to a reflective layer.

The "rapid cooling structure" employs such a layer structure as to enhance heat dissipation and to increase a cooling speed at the time of recrystallization of molten recording layer, thereby solving trade-off between recrystallization during amorphous mark formation and a high erasability by high speed crystallization.

Thus, if the film thickness of upper protective layer 4 is too large, it takes a long time until the heat of recording layer 3 reaches the reflective layer, and the heat dissipation effect by the reflective layer does not work effectively.

The present inventors have found that the linear velocity dependency can be more improved than conventional rapid cooling structure with aluminum alloy reflective layer by combining a reflective film having a high thermal conductivity with the upper protective layer 4 having rather a large thickness of from 30 nm to 60 nm, like silver, more preferably from 35 nm to 55 nm.

This is explained in more details with reference to FIG. 3.

Figure 3A:
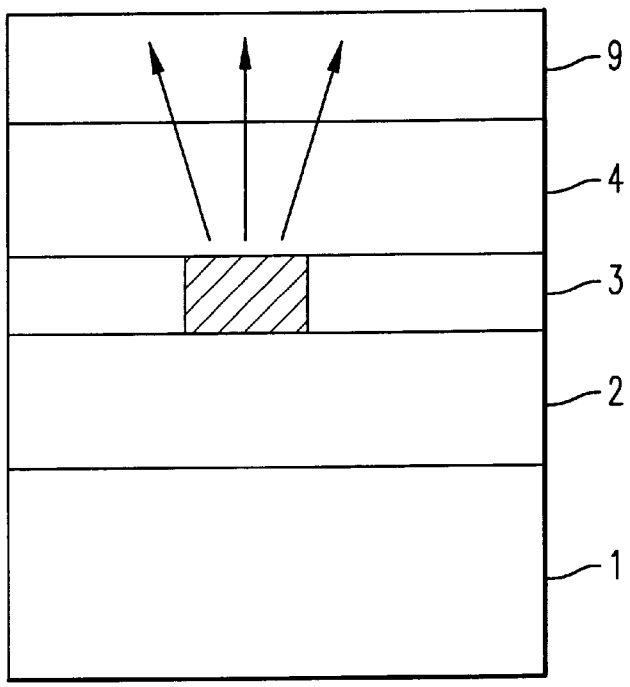
FIG. 3 illustrates a heat-diffusion state of a recording layer, wherein 1 is a substrate, 2 is a lower protective layer, 3 is a phase-change type recording layer, 4 is an upper protective layer, and 9 is a reflective layer.

First, it is necessary for recording to raise a temperature of recording layer higher than a melting point, but since it requires a certain retention time for thermal conduction, in the temperature-rising process (initial several tens nanoseconds or less), thermal conduction is not noticeable in the direction of horizontal plane surface (transverse direction) and temperature distribution is determined almost by thermal conduction in the direction of film thickness (FIG. 3(a)).

Accordingly, the thermal conduction in the film thickness direction effectively works for raising the temperature of the leading-edge of the recording mark to a predetermined temperature.

Figure 3B:
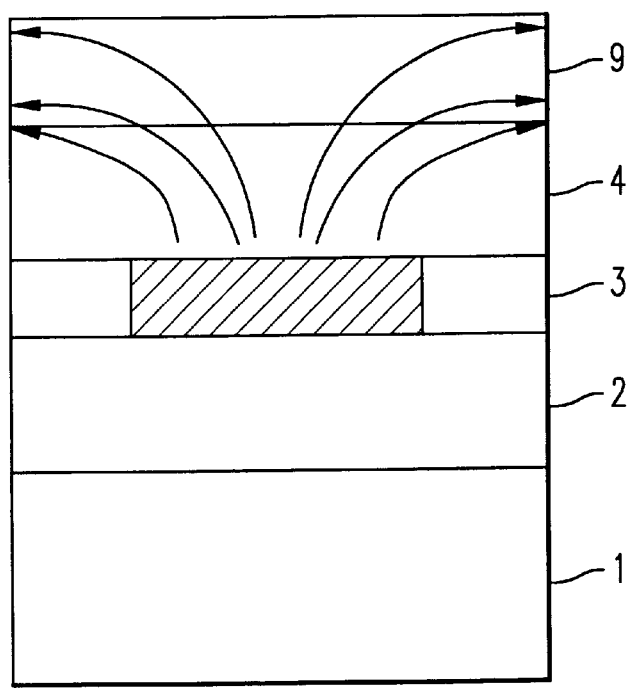

On the other hand, after several tens nanoseconds from the initiation of temperature-rising, the thermal conduction in the horizontal plane surface direction becomes important for temperature distribution as illustrated in FIG. 3(b).

This is because the thermal conduction in the film thickness direction is heat diffusion between a distance of at most 0.1 $\mu$m, while the thermal conduction in the plane surface direction is heat diffusion between a distance of 1 $\mu$m order.

Particularly, a cooling speed of recording layer controlling amorphous-forming process depends on this horizontal plane surface temperature distribution, and the linear velocity dependency of the cooling speed is strictly controlled by the horizontal plane temperature distribution.

At a low linear velocity, since a scanning speed of light beam is low, heat relatively widely reaches the periphery part within the same irradiation time, and the thermal conduction in the horizontal plane surface direction is influential.

Also, at the end part (trailing-edge) of a long mark continuously irradiated with a recording light beam for a relatively long time, the thermal conduction in the horizontal plane surface direction is influential.

Accordingly, in order to satisfactorily conduct mark length recording in such a wide linear velocity range as to make the maximum velocity/the minimum velocity ratio at least 2 times during overwriting, it is necessary to accurately control not only the temperature distribution in the film thickness direction and its time change but also the temperature distribution in the horizontal plane surface direction and its time dependency.

In FIG. 3(b), by making a thermal conductivity of the upper protective layer low and making the upper protective layer so as to have an appropriate thickness, a certain retardation effect can be achieved on heat flowing to a reflective layer and the temperature distribution in the horizontal plane surface direction can be properly controlled.

The conventional "rapid cooling structure" does not always consider the retardation effect of thermal conduction.

In the present invention, in order to fully achieve the retardation effect of thermal conduction, a material having a low thermal conductivity is preferably used for the upper protective layer 4, and preferable examples include a material containing ZnS, ZnO, $TaS_2$ or a rare earth sulfide alone or its mixture in an amount of from 20 mol % to 90 mol %. Further, a composite dielectric material containing a heat resistant compound having a melting point or a decomposition temperature of at least 1000° C. is preferable.

More preferable examples include a composite dielectric material containing a sulfide of a rare earth material such as La, Ce, Nd or Y in an amount of from 50 mol % to 90 mol %, and a composite dielectric material containing ZnS, ZnO or a rare earth sulfide in an amount of from 70 to 90 mol %.

Examples of the heat resistant compound material having a melting point or a decomposition point of at least 1000° C. include an oxide, a nitride or a carbide of Mg, Ca, Sr, Y, La, Ce, Ho, Er, Yb, Ti, Zr, Hf, V, Nb, Ta, Zn, Al, Si, Ge, Pb or the like, or a fluoride of Ca, Mg, Li or the like.

Particularly, examples of a material to be mixed with ZnO include a sulfide of a rare earth element such as Y, La, Ce, Nd or the like, or a mixture of sulfide and oxide.

A thin film containing $SiO_2$, $Ta_2O_5$, $Al_2O_3$, AlN, SiN or the like as the main component is not preferable since its thermal conductivity is too high. Particularly, the upper protective layer preferably contains sulfur, and more preferably contains a sulfide such as ZnS, $TaS_2$, a rare earth sulfide or the like.

In view of mechanical strength, it is preferable that these protective layers have a film density of at least 80% of bulk state.

In a case where a thin film of a dielectric mixture is employed, a theoretical density of the following formula is used as the bulk density:

$$\rho = \Sigma m_i \rho_i \quad (1)$$

$m_i$: mol concentration of each component i
$\rho_i$: bulk density of each component The upper protective layer 4 also has an effect of preventing mutual diffusion between a recording layer 3 and a reflective layer 5.

As mentioned above, the upper protective layer 4 has a film thickness of generally from 30 nm to 60 nm, preferably from 35 nm to 55 nm.

If the film thickness is less than 30 nm, a satisfactory retardation effect of thermal conduction can not be achieved, and if the film thickness exceeds 60 nm, a satisfactory heat dissipation effect to the reflective layer can not be achieved, and plastic deformation by heat cycle during repetitive overwriting is accumulated within the inside of the protective layer, and deterioration tends to be accelerated in proportion to the number of overwriting.

In the Embodiment (1), when the upper protective layer 4 is simply made thick in order to achieve the retardation effect of thermal conduction by the above protective layer, a cooling rate becomes too low, and it is therefore necessary to use a reflective layer having such a high thermal conductivity as to achieve a satisfactory rapid cooling effect after a predetermined retardation time.

However, it is pretty difficult to measure the thermal conductivity of such a thin film as the reflective layer employed in the present invention, and its reproducibility is likely to become poor.

Generally, the thermal conductivity of a thin film is small and is largely different from the thermal conductivity of bulk state. Particularly, a thin film of at most 40 nm is not preferable since its thermal conductivity becomes smaller in the order of one figure by the influence of island structure of the initial growing stage.

Therefore, in the present invention, an electric resistance of the reflective film is made a standard indication in place of the thermal conductivity.

With regard to a material like a metal wherein electron flow and scattering process mainly controls thermal or electric conduction, there is a satisfactory proportional relation between a thermal conductivity and an electric conductivity, and therefore, it is possible to estimate a thermal conductivity by measuring an electric resistance.

The electric resistance of a thin film is expressed by a resistivity value defined by its film thickness and an area of measured zone. For example, a volume resistivity and a sheet resistivity are measured generally by four probe resistivity method as defined by JIS K7194.

By this method, a satisfactory data having better reproducibility can be obtained more conveniently than measuring a thermal conductivity of a thin film. As the volume resistivity is lower, the thermal conductivity becomes higher proportionally.

In the Embodiment (1), the reflective layer is composed of at least two layers including a first reflective layer containing aluminum as the main component and having a film thickness of from 5 nm to 50 nm and a second reflective layer containing silver as the main component and having a film thickness of from 40 nm to 200 nm and a volume resistivity of from 20 n$\Omega$·m to 80 n$\Omega$·m.

That is, at least one layer works as the above-mentioned low volume resistivity material which substantially achieves a heat dissipation effect, and the other layer works so as to improve corrosion resistance, adhesion to a protective layer and hillock resistance.

Particularly, when the upper protective layer contains a sulfide, it is preferable to make such a structure since the sulfide is corrosive to a metal such as Ag.

The first reflective layer preferably has a thickness of from 5 nm to 50 nm. If the thickness is less than 5 nm, a protective effect is insufficient, and if the thickness exceeds 50 nm, a heat dissipation to the second reflective layer is likely to become poor.

The second reflective layer preferably has a thickness of from 40 nm to 200 nm. If the thickness is less than 40 nm, a heat dissipation effect is likely to become insufficient. On the other hand, if the thickness exceeds 200 nm, a crack tends to occur and a film-forming time becomes long, thereby lowering a productivity.

In order to improve optical properties, a third reflective layer may be provided further on the second reflective layer. In such a case, the third reflective layer may be a material having a high volume resistance.

Generally, it is possible to use a reflective layer having a high thermal conductivity, provided that a volume resistivity is from 20 n$\Omega$·m to 150 n$\Omega$·m.

A material having a volume resistivity of less than 20 n$\Omega$·m is hardly obtainable in a thin film state.

When the volume resistivity is higher than 150 n$\Omega$·m, a sheet resistivity can not be lowered unless a thick film of exceeding 300 nm is provided. According to the study by the present inventors, a material having such a high volume resistivity does not achieve a satisfactory heat dissipation effect even when a sheet resistivity is lowered. This is because a heat capacity per unit area increases in the case of a thick film.

Further, it takes a long time to make such a thick film, and it is unpreferable also in view of production cost since a material cost increases.

Accordingly, it is preferable to use a material having a film thickness of at most 300 nm and a low volume resistivity (sheet resistivity of from 0.2 to 0.9$\Omega$/□).

Thus, the first reflective layer containing aluminum as the main component is provided to improve corrosion resistance, adhesion to a protective layer and hillock resistance, but it should preferably have a volume resistivity of from 20 n$\Omega$·m to 150 n$\Omega$·m since a heat dissipation effect of a second reflective layer is hardly achieved if a thermal conductivity is too high.

In view of adhesion and reactivity with sulfur, the first reflective layer containing aluminum in an amount of at least 95 atomic %, more preferably 98 atomic %, is preferable. Particularly, most preferable examples include pure aluminum or an aluminum alloy containing at least one component selected from the group consisting of Ta, Ti, Co, Cr, Si, Sc, Hf, Pd, Pt, Mg, Zr, Mo and Mn in an amount of from 0.2 atomic % to 2 atomic %. Particularly, the former example is known to increase a volume resistivity in proportion to the concentration of element added and to improve hillock resistance (see Japan Metal Society Journal, volume 59, (1995), pp 673–678, J. Vac. Sci. Tech., A14 (1996), pp 2728–2735 and the like), and it is employed by taking durability, volume resistivity, film-forming speed and the like into consideration.

If the amount of the above-mentioned element to be added is less than 0.2 atomic %, a satisfactory hillock resistance is hardly obtainable although it depends on film-forming conditions. On the other hand, if the amount of the element exceeds 2 atomic %, the above-mentioned low resistivity is likely to be hardly obtainable.

Particularly, in order to achieve a satisfactory archival stability, it is preferable to add Ta or Ti, particularly Ta, as an additive.

Also, an Al—Mg—Si system alloy containing from 0.3 wt % to 0.8 wt % of Si and from 0.3 wt % to 1.2 wt % of Mg is preferable.

In the Embodiment (1), the second reflective layer containing silver as the main component has a volume resistivity of from 20 nΩ·m to 80 nΩ·m.

Preferable examples of a thin film having a volume resistivity of from 20 nΩ·m to 80 nΩ·m include pure silver or a silver alloy containing at least one element selected from the group consisting of Ti, V, Ta, Nb, W, Co, Cr, Si, Ge, Sn, Sc, Hf, Pd, Rh, Au, Pt, Mg, Zr, Mo and Mn in an amount of from 0.2 atomic % to 2 atomic %.

Particularly, in order to improve archival stability, it is preferable to use Ti, Pd or Mg as an additive.

A volume resistivity of the above-mentioned Al or Ag increases in proportion to an impurity concentration.

It is considered that the addition of an impurity generally reduces a crystal grain size and lowers a thermal conductivity by increasing electron scattering at grain boundary. It is necessary for obtaining the material inherently having a high thermal conductivity by enlarging a crystal grain size to control the amount of an impurity added.

A reflective layer is formed usually by sputtering method or vacuum vapor deposition method, but it is necessary to control the total impurity amount at most 2 atomic %, the total impurity amount including not only an impurity amount contained in a target or a vapor deposition material but also water or an oxygen amount incorporated during film-formation.

For this reason, it is desirable to control a background pressure in a process chamber to at most $1 \times 10^{-3}$ Pa.

When a film is formed under a background pressure of less than $1 \times 10^{-4}$ Pa, it is preferable to prevent incorporation of impurities by controlling a film-forming rate in the range of from 1 nm/sec to 10 nm/sec.

When an impurity element is added intentionally in an amount of at least 1 atomic %, it is preferable to prevent additional incorporation of other impurities by raising a film-forming rate to at least 10 nm/sec.

A crystal grain size is sometimes influenced by conditions such as a sputtering pressure.

For example, an alloy film obtained by incorporating Ta in an amount of about 2 atomic % into Al includes an amorphous phase among crystal grains, but the ratio of a crystal phase and an amorphous phase depends on film-forming conditions. While sputtering is carried out under a lower pressure, the proportion of a crystalline part is increased and a volume resistivity is lowered (thermal conductivity is raised).

Impurity composition or crystallinity in the film is influenced also by a method of preparing an alloy target and a sputtering gas (Al, Ne, Xe and the like) used in the sputtering process.

Accordingly, even if the above Al alloy composition is disclosed as a reflective layer material (JP-A-3-1338, JP-A-1-169571, JP-A-1-208744 and the like), such a volume resistivity layer structure as defined in the present invention can not always be formed.

As mentioned above, in order to obtain a high thermal conductivity, it is preferable to reduce an impurity amount, but in the case of pure Al or Ag metal, corrosion resistance and hillock resistance tend to become poor, and therefore the optimum composition is determined by taking a satisfactory balance between the two properties into consideration.

However, it has been found that a medium having the two reflective layers has a poor storage stability. Recording can not be carried out on such a medium stored under conditions of a high temperature and a high humidity.

According to Auger depth profile, it has been found that the two reflective layers are formed into an alloy.

As mentioned above, when an impurity is added, a thermal conductivity of metal is lowered. When the alloy-formation between Al and Ag occurs, a thermal conductivity is rapidly deteriorated, and a rapid cooling rate necessary for forming amorphous marks can not be achieved, thereby making the recording impossible.

Accordingly, in the Embodiment (1), the first reflective layer comprises a material containing aluminum as the main component and the second reflective layer comprises a material containing silver as the main component, and consequently, it is preferable to provide a layer preventing the diffusion of aluminum and silver as the diffusion-preventing layer.

Examples of a material for the diffusion-preventing layer include metal, semiconductor, metal oxide, metal nitride, metal carbide, semiconductor oxide, semiconductor nitride, semiconductor carbide, carbon and the like. Examples of the metal used as the diffusion-preventing layer include at least one element selected from the group consisting of Ta, Ni, Co, Cr, Si, W and V. Among them, Ta and/or Ni are preferable.

Examples of the oxide, nitride or carbide of metal or semiconductor used as the diffusion-preventing layer include at least one component selected from the group consisting of silicon oxide, silicon nitride, silicon carbide, tantalum oxide, cerium oxide, lanthane oxide and yttrium oxide. Specifically, examples of the amorphous carbon used as the diffusion-preventing layer include hydrogenated amorphous carbon. Particularly preferable examples include compounds of a material used for the first reflective layer or the second reflective layer with oxygen and/or nitrogen. Tantalum is also a particularly preferable material. As a particularly preferable embodiment, a material containing aluminum as the main component is used for the first reflective layer and a material containing silver as the main component is used for the second reflective layer and a material comprising tantalum or aluminum oxide is used for the diffusion-preventing layer.

The diffusion-preventing layer can be formed by ordinary sputtering technique, but is formed preferably by the following method.

After forming the first reflective layer, in-line vacuum is removed and the first reflective layer is allowed to stand under the atmosphere, thereby forming an oxide film naturally from the first reflective layer material and oxygen (or moisture) in the atmosphere on the first reflective layer of a disk. Thereafter, the disk is returned under vacuum, and a second reflective layer is formed by sputtering or the like. In this manner, the diffusion-preventing layer can be easily provided.

Also, by an ozone treatment of the surface of first reflective layer, the diffusion-preventing layer can be provided in shorter time, because the ozone treatment promotes a formation of passive oxide layer for preventing diffusion.

The oxide layer of the diffusion-preventing layer thus formed prevents the diffusion of the first reflective layer and the second reflective layer at the boundary therebetween and disk properties provided immediately after film-formation can be maintained as they are, even when the disk is allowed to stand under conditions of 80° C. and 85% RH for 1000 hours.

Alternatively, before or after forming the first reflective layer, an oxide or nitride layer may be formed as a very thin sputtering film by intentionally introducing oxygen or nitrogen into a film-forming device under vacuum condition. This method is preferable in view of operation efficiency since it is not necessary to break the vacuum condition.

In any case, the diffusion-preventing layer should preferably have such a small thickness of usually at most 200 Å, preferably at most 100 Å, more preferably at most 50 Å that it does not become a hindrance as a thermal resistance. The most preferable thickness of the diffusion-preventing layer is from 0.1 nm to 5 nm. It can be confirmed by the same Auger depth profile that the diffusion-preventing layer satisfactorily prevents mutual diffusion between aluminum and silver.

Hereinbefore, the present invention is described with reference to a very limitative and concrete application example concerning CD-compatible CD-RW of a low reflectance, but the present invention is effective to improve a linear velocity dependency and a recording power dependency of mark length recording of a phase-change type recording medium, and the present invention is not specially limited to CD-RW. It is considered that the present invention is effective also for a rewritable high density digital video disk (DVD) presently proposed.

Also, since a linear velocity margin is broadened by the present invention, the present invention solves also a problem concerning a recording property difference caused by a linear velocity difference at the inner or outer periphery of a disk used at a constant rotation velocity, such as CAV (constant angular velocity) or ZCAV (zoned CAV).

Hereinafter, other components of the present invention is described referring to FIG. 3.

In FIG. 1, examples of a substrate 1 include a transparent glass or a transparent resin such as polycarbonate, acryl, polyolefin or the like. Among them, polycarbonate resin is most preferable since it is inexpensive and has been most commonly and successfully used for CD.

A lower protective layer 2 is provided to prevent deformation at a high temperature during recording.

A material for the lower protective layer 2 is selected by considering refractive index, heat conductivity, chemical stability, mechanical strength, adhesion and the like. Preferable examples include generally an oxide, a sulfide or a nitride of a semiconductor or a metal having a high transparency and a high melting point, and a fluoride of Ca, Mg or Li. In addition to the above materials, various materials usable for an upper protective layer can also be used for the lower protective layer.

These oxides, sulfides, nitrides or fluorides do not necessarily have a stoichiometric composition, and it is effective to adjust a composition or to mix for controlling a refractive index or the like.

A dielectric mixture is preferable when considering repetitive recording properties. Concrete examples include a mixture of ZnS or a rare earth sulfide with a heat resistant compound such as an oxide, a nitride, a carbide or the like. A film density of a lower protective layer is preferably at least 80% of bulk state in the same manner as in an upper protective layer, thus providing a satisfactory mechanical strength.

A thickness of the lower protective layer is usually from 10 to 500 nm. If the lower protective layer is too thin, a deformation-preventing effect is not satisfactorily applied on a substrate or a recording film, and does not work as a protective layer. On the other hand, if the lower protective layer is too thick, cracks tend to occur due to internal stress of a dielectric material itself or due to an elastic property difference occurred between the protective layer and the substrate. Particularly, since the lower protective layer has a function to prevent a substrate deformation by heat, the thickness of the protective layer is usually at least 50 nm. If the lower protective layer is too thin, a slight substrate deformation is accumulated during repetitive overwriting, thereby causing noises by scattering retrieving light.

The upper limit of the thickness of the lower protective layer is usually 200 nm in view of a film-forming time, and if the lower protective layer is too thick, a groove geometry tends to change on the recording layer surface. That is, a groove depth becomes smaller than expected on the substrate surface, or a groove width becomes smaller than expected on the substrate surface. Accordingly, the lower protective layer should preferably have a thickness of at most 150 nm.

The multilayer structure of the Embodiment (1) comprising a first reflective layer containing aluminum as the main component, a diffusion-preventing layer and a second reflective layer containing silver as the main component, has a function of light-reflecting at a high reflectance and a function of heat-dissipating at a high thermal conductivity and also has a satisfactory archival stability, as a whole. Therefore, an excellent optical information recording medium can be obtained even by providing them on a protective layer containing no sulfur.

Particularly, the multilayer structure comprising a first reflective layer of an aluminum alloy containing 0.1 atomic % to 2 atomic % of tantalum, a diffusion-preventing layer of tantalum and a second reflective layer of pure silver, provides a satisfactory reflectance and a satisfactory thermal conductivity stably for quite a long term without causing mutual alloy-formation and precipitation of tantalum in the first reflective layer.

In the Embodiment (2), the intermediate layer comprises an element which does not form a compound with silver, the element contained in the intermediate layer having a solid solubility of at most 5 atomic % to silver and silver having a solid solubility of at most 5 atomic % to the element contained in the intermediate layer and having less reactivity to sulfur or its sulfide comprises chemically stable elements. Alternatively, the intermediate layer comprises an element which forms a continuous series of solid solutions with silver, or comprises amorphous carbon or an oxide, a nitride or a carbide of a semiconductor or metal.

As this result, a change as a lapse of time of recording properties can be prevented simply by forming the intermediate layer of monolayer.

In the Embodiment (2), a material used for an intermediate layer may be the same as various materials illustrated as a material usable for a diffusion-preventing layer in the Embodiment (1). That is, examples of the material usable for the intermediate layer in the Embodiment (2) include metal, semiconductor, metal oxide, metal nitride, metal fluoride, metal carbide, semiconductor oxide, semiconductor nitride, semiconductor fluoride, semiconductor carbide and other various compounds and amorphous carbon, gold and palladium.

Examples of a metal usable for the intermediate layer include at least one element selected from the group consisting of Ta, Ni, Co, Cr, Si, W and V. Among them, Ta and/or Ni are preferable, and particularly Ta is preferable. A layer containing a material which makes an alloy with silver easily, for example, Ge or Al, can not be used as the intermediate layer, except when it is used with other layers. Examples of a material usable for the diffusion-preventing layer include an oxide, a nitride or a carbide of metal or semiconductor, such as at least one component selected from the group consisting of silicon oxide, silicon nitride, silicon carbide, tantalum oxide, cerium oxide, lanthanum oxide and yttrium oxide. Examples of amorphous carbon usable for the diffusion-preventing layer include amorphous hydrogenated carbon. Particularly preferable materials are metal or carbon.

Also, tantalum oxide has functions of both of a diffusion-preventing layer and a dielectric protective layer. Further, in the case of a phase-change type recording medium, tantalum oxide is preferable as an excellent protective layer material.

When using a material absorbing laser light, such as Ta, Ni or the like, as an intermediate layer, an optical disadvantage is provided and a recorded signal intensity sometimes becomes low.

Also, this intermediate layer may contain other elements as far as the addition of other elements does not substantially hinder their functions.

The intermediate layer has a film thickness of usually at least 1 nm, preferably at least 5 nm, and usually at most 100 nm, preferably at most 50 nm, more preferably at most 20 nm. If the intermediate layer is thinner than 1 nm, the aimed effect of the intermediate layer can not be achieved, and if the intermediate layer is thicker than 100 nm, its effect as a heat dissipation layer for a reflective layer tends to be poor. Also, due to a film stress, a substrate is deformed or cracks occur. Further, it is unfavorable in view of production cost and tact.

Other parts of the structure of the optical information recording medium of the Embodiment (2) are described in more details hereinafter. The basic layer structure of the Embodiment (2) is the same as that of the Embodiment (1).

Examples of a substrate include glass or a transparent resin such as polycarbonate, acryl or polyolefin. Among them, polycarbonate is particularly preferable since it is cheap and it has been successfully used.

However, when recording or retrieving by placing a head such as a float type head or a contact type head in the vicinity or in contact with a medium, glass or a resin having a higher stiffness or heat resistance or metal may be used as a substrate.

Also, when recording and retrieving are not carried out through a substrate, the substrate is not necessarily transparent.

The recording layer is usually coated with a protective layer on both sides.

A material for the protective layer is selected by considering refractive index, heat conductivity, chemical stability, mechanical strength, adhesion and other properties. Generally, examples of the material include an oxide, a sulfide or a nitride of semiconductor or metal having a high transparency and a high melting point, and a fluoride of Ca, Mg, or Li. These oxides, sulfides, nitrides or fluorides do not necessarily have a stoichiometric composition, and it is sometimes effective to adjust the composition for controlling a refractive index or other properties or to use in a mixture. A dielectric mixture is preferable in view of repetitive recording properties. More concrete examples include mixtures of ZnS or rare earth sulfides with heat resistant compounds such as oxides, nitrides or carbides. For example, a mixture of ZnS with $SiO_2$ is often used as a protective layer for a phase-change type optical disk.

An upper protective layer provided on the reflective layer side of the recording layer contains sulfur, preferably ZnS, $TaS_2$, a rare earth sulfide or the like. Other materials for the upper and lower protective layers may be the same as those illustrated in the Embodiment (1).

The protective layers preferably have a film density of at least 80% of bulk state in view of mechanical strength (Thin Solid Films, volume 278, pages 74–81, 1996).

The thickness of a protective layer is usually from 10 to 500 nm. If the protective layer is too thin, a deformation-preventing effect can not be satisfactorily applied on a substrate or a recording film, and therefore the protective layer is likely to hardly achieve its function. Also, if the protective layer is too thick, cracks tend to occur due to an internal stress of a dielectric material itself or due to an elastic property difference to a substrate. Particularly, it is necessary for the lower protective layer to control a substrate deformation by heat, and therefore the lower protective layer usually has a thickness of at least 50 nm. On the other hand, if it is too thin, minor substrate deformations are accumulated during repetitive overwriting, thereby sometimes causing noises by scattering retrieving light.

The upper limit of the thickness of the lower protective layer is substantially about 200 nm in view of a film-forming time, and if the thickness is too large, a groove geometry is sometimes changed on the recording layer surface. That is, the depth of the groove becomes smaller than the aimed shape on the substrate surface, and also the groove width becomes smaller than the aimed shape on the substrate surface. Therefore, the upper limit of the lower protective layer is preferably at most 150 nm.

On the other hand, in order to prevent a deformation of the recording layer, the upper protective layer should have a thickness of usually at least 5 nm, preferably at least 10 nm. If the upper protective layer is too thick, microscopic plastic deformations are accumulated in the inside of the upper protective layer during repetitive overwriting, thereby scattering retrieving light to cause noises. Thus, the upper limit of the thickness of the upper protective layer is usually 60 nm, preferably 50 nm.

A well known phase-change type optical recording layer can be used as the recording layer, and a compound such as GeSbTe, InSbTe, AgSbTe, AgInSbTe or the like can be selected as an overwritable material.

Among them, a thin film containing an alloy of $\{(Sb_2Te_3)_{1-x}(GeTe)_x\}_{1-y}Sb_y$ ($0.2 < x < 0.9$, $0 \leq y < 0.1$) or an alloy of $Ma_w(Sb_zTe_{1-z})_{1-w}$ (wherein $0 \leq w \leq 0.3$, $0.5 \leq z \leq 0.9$ and Ma is at least one component selected from the group consisting of In, Ga, Zn, Ge, Sn, Si, Cu, Au, Ag, Pd, Pt, Pb, Cr, Co, O, N, S, Se, Ta, Nb, V, Bi, Zr, Ti, Mn, Mo, Rh and a rare earth element), is preferable since it is stable in either crystalline or amorphous state and it enables a high speed phase-change between both states.

Further, it has an advantage that segregation hardly occurs, and it is therefore the most practical material.

If the recording layer is phase-change type, its thickness is usually at least 10 nm and at most 100 nm.

If the recording layer is too thin, a satisfactory contrast is hardly obtainable and a crystallization speed tends to become low, and it is hard to carry out recording and erasing in a short time.

On the other hand, if the recording layer is too thick, an optical contrast is also hardly obtainable, and cracks tend to occur. Thus, a particularly preferable thickness of the recording layer is at least 10 nm and at most 30 nm.

If the thickness is less than 10 nm, the reflectance becomes too low, and if the thickness is more than 30 nm, the heat capacity becomes too large, thereby likely to deteriorate a recording sensitivity.

The recording layer can be obtained usually by sputtering an alloy target in an inert gas, such as Al gas.

The thickness of each of the recording layer and the protective layer is adjusted in view of the above-mentioned mechanical strength and reliability, and is selected in such a manner as to provide a satisfactory absorbing efficiency of laser light by considering an optical interference effect caused by a multilayer structure and is selected also in such a manner as to provide a large recording signal amplitude, i.e. to make a large contrast between recorded state and unrecorded state.

As mentioned above, a recording layer, a protective layer and a reflective layer are formed by sputtering method or the like. In order to prevent oxidation or pollution among layers, film-formation is carried out in an in-line apparatus wherein a target for a recording film, a target for a protective film, and if necessary, a target for a reflective layer material, are placed in the same vacuum chamber provided therein. This method is excellent also in the aspect of productivity.

A material containing silver as the main component used as a reflective layer in the Embodiment (2) may be the same material as that of the second reflective layer used in the Embodiment (1). Its thickness is usually from 30 to 300 nm, preferably from 40 to 200 nm. If the thickness is too large, the recording sensitivity is likely to become lower because heat capacity of the reflective layer becomes too much and a crack tends to occur. On the other hand, if the thickness is too small, reflectivity is likely to become insufficient and a heat dissipation effect of the silver reflective layer is hardly achieved.

EXAMPLES

Now, the present invention will be described in further detail with reference to Examples. However, it should be understood that the present invention is by no means restricted to such specific Examples.

The value of the solid solubility of each element is referred to "Constitution of Binary Alloys", (Max Hansen and Kurt Anderko, second edition (1985), Genium Publishing Corporation, New York).

The compositions of the respective layers were confirmed by a combination of e.g. fluorescent X-ray analysis, atomic absorption analysis and X-ray-excited photoelectron spectrometry.

The film density of the protective layer was obtained from the weight change in a case where it was formed in a thickness of as thick as a few hundreds nm on a substrate. The layer thickness was obtained by correcting the fluorescent X-ray intensity by the layer thickness measured by a tracer.

The sheet resistivity of the reflective layer was measured by a four probe resistivity meter (Loresta FP, tradename manufactured by Mitsubishi Petrochemical Co., Ltd. (presently Dia Instruments)). The resistivity measurement was carried out with regard to a reflective layer coated on a glass or polycarbonate substrate which is an insulator or with regard to a reflective layer which is the uppermost layer of the quadri-layer structure as shown in FIG. 1 (before coating a UV ray-curable resin protective layer).

The upper protective layer is an insulator and thus gives no influence on measurement of the sheet resistivity. Further, the disk substrate had a diameter of 120 mm, and in this measurement, it can be regarded substantially as having an infinite area. Therefore, the measurement can be made as it is.

From the resistance value R thus measured, the sheet resistivity rS and the volume resistivity rV were calculated by the following formulas, wherein t is the layer thickness, and F is a corrective factor determined by the shape of the thin film region and takes a value of from 4.3 to 4.5. Here, F was taken to be 4.4.

$$rS = F \cdot R \tag{2}$$

$$rV = rS \cdot t \tag{3}$$

The disk evaluations were carried out at the following conditions, unless otherwise noted.

For evaluation of recording/retrieving, DDU1000 evaluation machine, manufactured by Pulstec, was used. The recording linear velocity was from 1.2 to 4.8 m/s, and the retrieving velocity was 2.4 m/s. The wavelength of the optical head was 780 nm, and NA was 0.55.

Figure 2A:
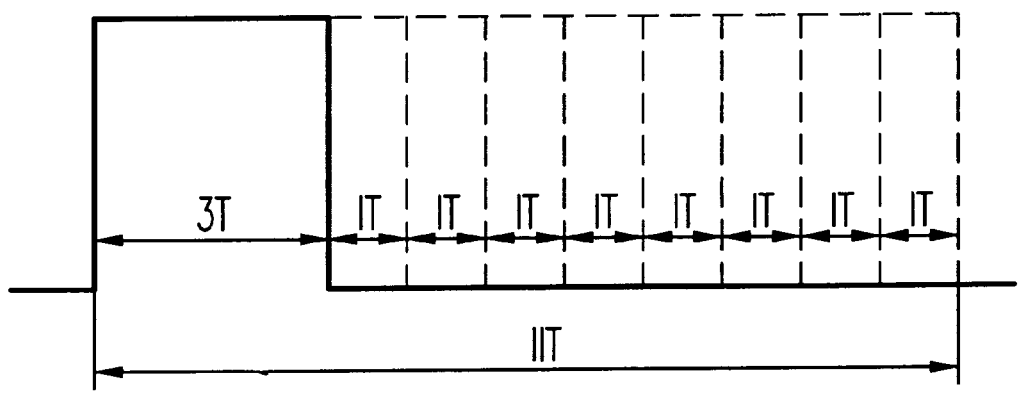
FIG. 2 illustrates an example of recording pulse strategy used in the present invention.
Figure 2B:
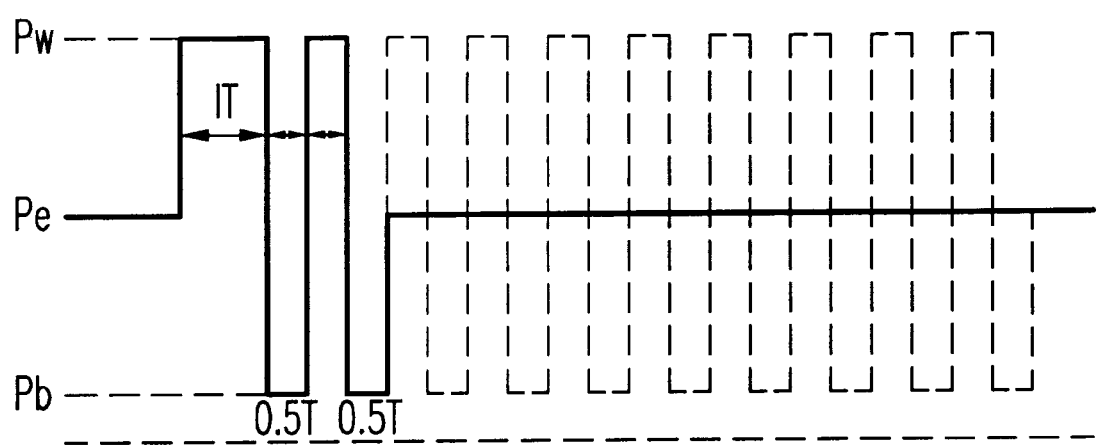

The pulse strategy shown in FIG. 2 was used for recording of EFM (Eight-Fourteen Modulation) random pattern, wherein T is a clock period, and in the recording mark-formation part, a recording power Pw is irradiated into a recording pulse period and a bias power Pb is irradiated into an off-pulse period, and the irradiations of the recording power Pw and the bias power Pb were made alternatively, and an erasing power Pe is applied between mark parts. However, at a linear velocity of at least 2.8 m/s, there is a case where Pb=Pe during the off-pulse period at the rear-most end of the mark. Pb was constant at 0.8 mW at all linear velocities.

The clock period at 2-times velocity of CD was 115 nsec. At the time of switching the linear velocity, the clock period T was reversely proportional to the linear velocity. The retrieving velocity was 2-times velocity, and the allowable value of jitter was 17.5 nsec as stipulated in the CD standards.

The recording layer immediately after the film formation is amorphous, and is initialized by a bulk eraser. Namely a laser beam with a wavelength of about 830 nm focused to have a long axis of about 70 μm and a short axis of about 1.3 μm, was applied with an initialization power of from 500 to 600 mW at a linear velocity of 3.5 m/s to crystallize the layer over the entire area to obtain the initial state (unrecorded state).

With this power, the recording layer is believed to have once melted and then crystallized during resolidification.

The substrate is a polycarbonate substrate having a thickness of 1.2 mm in which grooves having a width of 0.53 μm and a depth of 32 nm are formed at a track pitch of 1.6 μm by injection-molding, unless otherwise specified.

The groove geometry was obtained by U-groove approximation by using an optical diffraction method. Of course, the groove geometry may be actually measured by a scanning electron microscope or a scanning probe microscope. In such a case, the groove width is a groove width taken at a position of one half in the depth of the groove.

Example 1

On a polycarbonate substrate, 95 nm of a lower protective layer $(ZnS)_{80}(SiO_2)_{20}$, 17.5 nm of a recording layer $Ag_5In_5Sb_{61.5}Te_{28.5}$ and 38 nm of an upper protective layer $(ZnS)_{80}(SiO_2)_{20}$ were formed, and $Al_{99}Ta_1$ alloy having a film thickness of 40 nm as a first reflective layer and Ag having a film thickness of 60 nm as a second reflective layer were further formed.

The layers from the upper protective layer to the first reflective layer were formed by sputtering method without breaking vacuum, and after forming the first reflective layer, the multilayered structure was allowed to exposure of the room ambience for 5 hours, and the second reflective layer was formed under vacuum again by sputtering method.

After forming the second reflective layer, a UV ray-curable resin was coated as an overcoating layer in a thickness of 4 μm by spin coating method.

The first reflective layer was formed at a film-forming rate of 1.3 nm/sec at a final vacuum degree of not higher than $2 \times 10^{-4}$ Pa under Ar pressure of 0.54 Pa. The volume resistivity was 92 nΩ·m. Impurities such as oxygen, nitrogen, etc. were below the detectable level by X-ray excited photoelectron spectrometry. The sum of all impurities could be regarded as not higher than about 1 atomic %.

The second reflective layer was formed at a film-forming rate of 1.3 nm/sec at a final vacuum degree of not higher than $2 \times 10^{-4}$ Pa under Ar pressure of 0.54 Pa. The volume resistivity was 32 nΩ·m. Impurities such as oxygen, nitrogen, etc. were below the detectable level by X-ray excited photoelectron spectrometry. The sum of all impurities could be regarded as not higher than about 1 atomic %.

The film density of the $(ZnS)_{80}(SiO_2)_{20}$ protective layer was 3.50 g/cm$^3$, which was 94% of the theoretical bulk density of 3.72 g/cm$^3$.

Figure 4A:
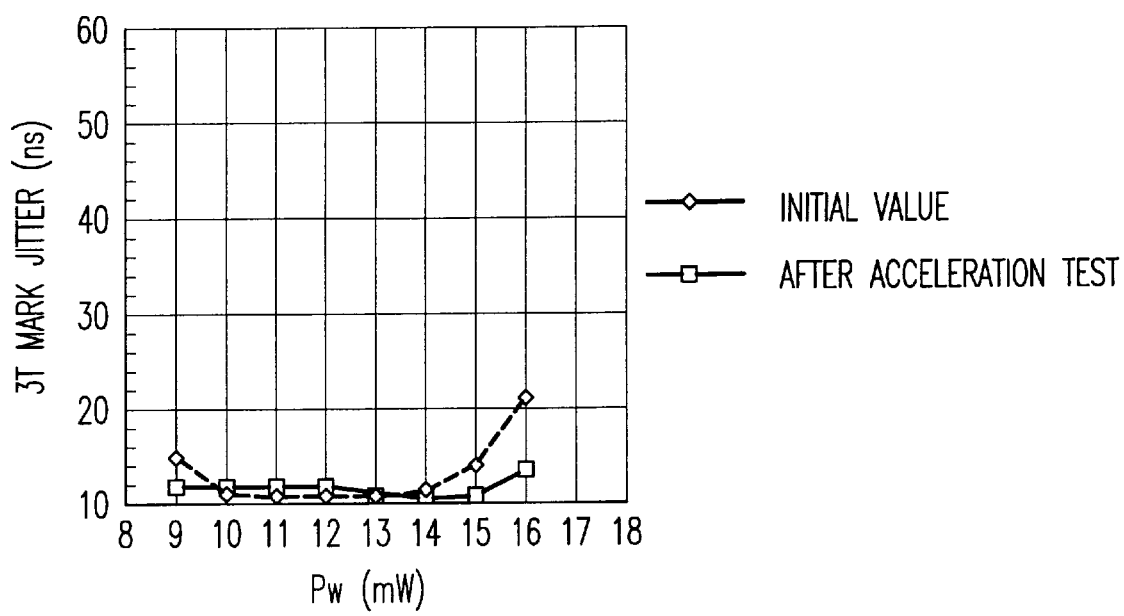
FIG. 4 is a graph illustrating a recording power dependency of jitter at 2.4 m/s in Example 1.
Figure 4B:
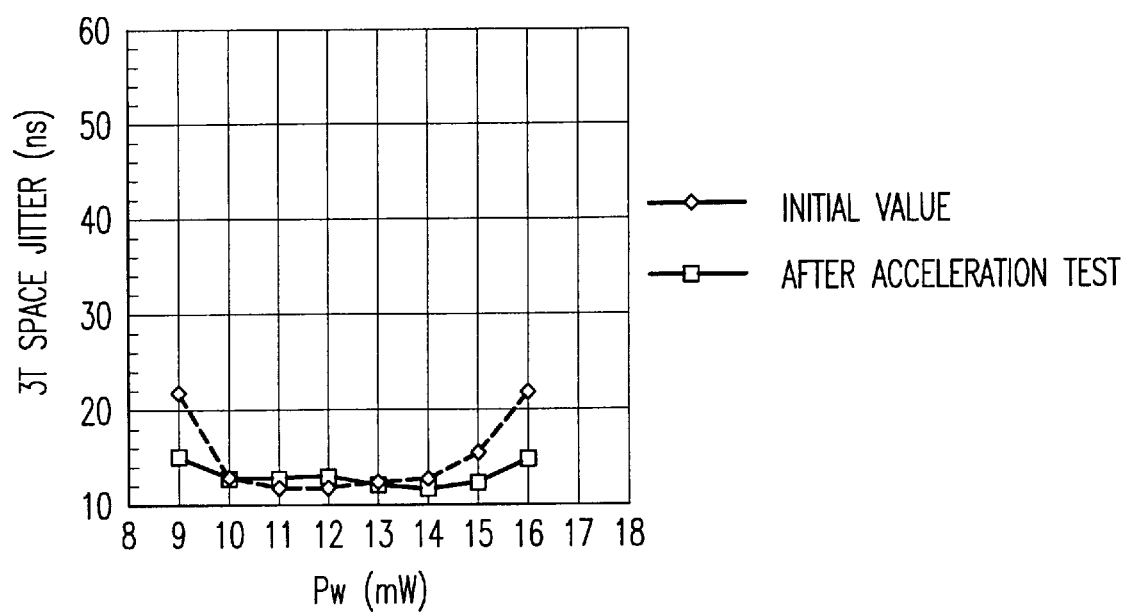

With regard to the above prepared medium, by employing the pulse strategy as illustrated in FIG. 2, 2 times-velocity (2.4 m/s) recording was carried out under a condition of Pe/Pw=0.5, and a recording power dependency of 3 T mark jitter and 3 T space jitter was shown as an initial value in FIG. 4.

Figure 5A:
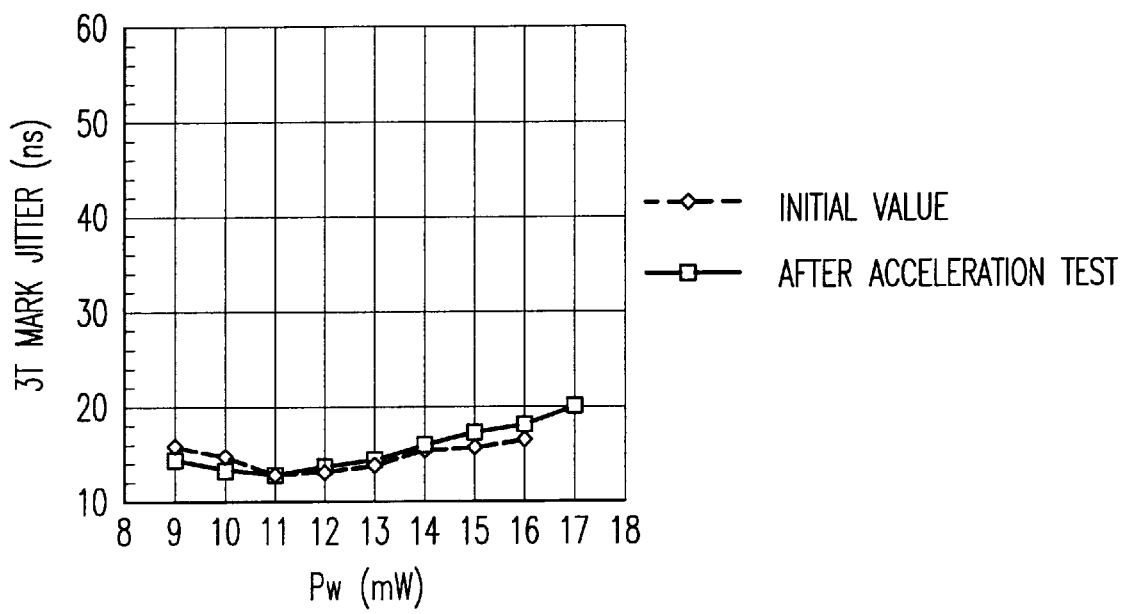
FIG. 5 is a graph illustrating a recording power dependency of jitter at 4.8 m/s in Example 1.
Figure 5B:
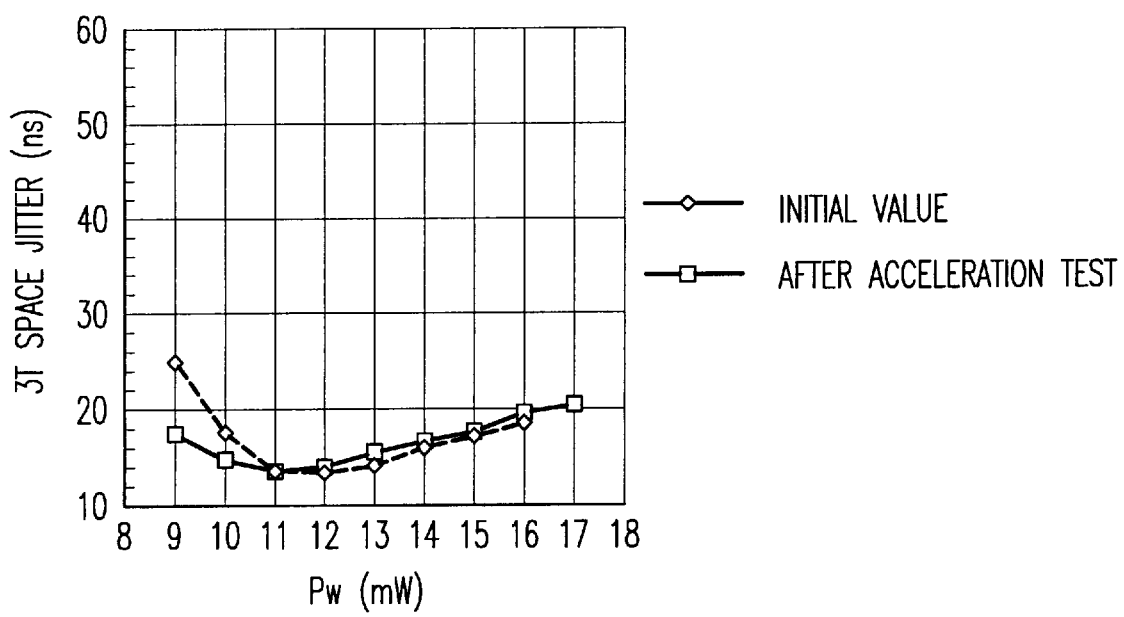

In the same manner as above, by employing the pulse strategy as illustrated in FIG. 2 except for making the clock period only half, 4 times-velocity (4.8 m/s) recording was carried out under a condition of Pe/Pw=0.5, and the recording power dependency was shown as an initial value in FIG. 5. In this case, the final off-pulse period was made 0.

In either case, overwriting was carried out ten times under predetermined conditions, and the measurement was carried out at 2 times-velocity (2.4 m/s).

As evident from FIGS. 4 and 5, at the 2 times-velocity and at the 4 times-velocity, both of the 3 T mark jitter and the 3 T space jitter had wide power margins.

After this disk was allowed to stand for 500 hours under conditions of a high temperature of 80° C. and a high humidity of 80% RH, 2 times-velocity and 4 times-velocity recordings were retrieved, and the results were shown as values after acceleration test in FIGS. 4 and 5. As evident from the results shown in FIGS. 4 and 5, jitter was not deteriorated at all in the recording power range usually used.

As mentioned above, at the 2 to 4 times velocities, wide linear velocities and recording power margins could be obtained.

Also, repetitive overwriting could be successfully carried out about 5000 times.

Before the acceleration test, the block error rate in the CD standards of this disk was averagely 10 counts per second, and the maximum value was at most 30 counts per second, and this rate was not substantially increased even after the acceleration test for 500 hours.

According to the Auger depth profile analysis of this disk, there was a peak showing the presence of oxygen at the boundary between the first reflective layer and the second reflective layer, and it was confirmed that oxide layers of Ag and Al were formed at the boundary.

Comparative Example 1

A disk having the same multilayer structure was prepared under the same film-formation conditions as in Example 1, except that all of the layers of from the lower protective layer to the second reflective layer were formed by sputtering method without breaking vacuum.

The first reflective layer and the second reflective layer were formed under the same film-formation conditions as in Example 1, and had the same volume resistivities as in Example 1.

At a 2 times velocity and at a 4 times velocity, power margins of 3 T mark jitter and 3 T space jitter were measured, and the results were substantially the same as those in Example 1.

Also, repetitive overwriting could be carried out up to about 5000 times.

However, after the disk was allowed to stand under conditions of a high temperature of 80° C. and a high humidity of 85% RH, the retrieved jitter was largely deteriorated. The average block error rate was increased more than 100 counts per second. 2 times velocity recording was tried by using this disk, but no clear amorphous marks could be formed.

When this disk was visually observed from the reflective layer side, the surface looked silver color at the time immediately after film-forming, but after allowing the disk to stand in accelerating conditions (80° C./80% RH) as mentioned above, it colored slightly bluish. According to the Auger depth profile analysis of this disk, it was confirmed that Al alloy of the first reflective layer and Ag of the second reflective layer were usually diffused to completely form an alloy.

Thus, it is considered that the alloy-formation between the two reflective layers lowered a heat conductivity, and consequently the recording i.e. amorphous mark formation could not be made.

According to Hansen's phase diagram, the solid solubility of Al to Ag is 42 atomic %.

Comparative Example 2

On a polycarbonate substrate, 95 nm of a lower protective layer $(ZnS)_{80}(SiO_2)_{20}$, 17.5 nm of a recording layer $Ag_5In_5Sb_{61.5}Te_{28.5}$, 38 nm of an upper protective layer $(ZnS)_{80}(SiO_2)_{20}$ and 50 nm of a reflective layer Ag were formed.

All of these layers were formed by sputtering method without breaking vacuum.

After forming the reflective layer, a UV ray-curable resin was coated as an overcoating layer having a thickness of 4 μm by spin coating.

The reflective layer was formed at a film-forming rate of 1.3 nm/sec at a final vacuum degree of not higher than $2 \times 10^{-4}$ Pa under Ar pressure of 0.54 Pa. The volume resistivity was 32 nΩ·m. Impurities such as oxygen, nitrogen, etc. were below the detectable level by X-ray excited photoelectron spectrometry. The sum of all impurities could be regarded as not higher than about 1 atomic %.

The film density of the $(ZnS)_{80}(SiO_2)_{20}$ protective layer was 3.50 g/cm$^3$, which was 94% of the theoretical bulk density of 3.72 g/cm$^3$.

The disk thus prepared was evaluated, and it was recognized that both of 3 T mark jitter and 3 T space jitter had wide power margins respectively at a 2 times velocity and at a 4 times velocity.

However, repetitive overwriting could be carried out only about 1000 times.

When visually observing this disk from the reflective layer side, the surface at the time immediately after film-formation looked silver color, but it was discolored after the acceleration test for 500 hours. It is considered that Ag was reacted with sulfur of the sulfide in the upper protective layer.

After film-formation, the disk was allowed to stand at room temperature for several days, and as this result, the Ag film was discolored in the same manner as above.

Example 2

On a polycarbonate substrate, a $(ZnS)_{80}(SiO_2)_{20}$ lower protective layer (105 nm), an $Ag_5In_5Sb_{62}Te_{28}$ recording layer (17 nm), a $(ZnS)_{80}(SiO_2)_{20}$ upper protective layer (40 nm), a $Ta_2O_5$ intermediate layer (10 nm) and an Ag reflective layer (90 nm) were formed by sputtering method, and a UV ray-curable resin was further coated thereon as a protective coating. After initially crystallizing this disk, recording was carried out by forming amorphous marks in grooves. With regard to the above prepared medium, by employing the pulse strategy as illustrated in FIG. 2, 2 times-velocity recording was carried out under the condition of Pe/Pw=0.5 and Pw=10 mW.

Thereafter, this disk was maintained under environment of 80° C. and 80% RH for 500 hours, and recording was carried out in the same manner as above. (hereinafter, operation of maintaining the disk under environment of 80° C. and 80% RH is referred to as "acceleration test".) Before and after the acceleration test, recording was carried out, and 3 T space jitter values were respectively 12.5 nsec and 14.3 nsec. Thus, the deterioration degree was small. Substantially the same results were obtained with regard to disks prepared by varying a film thickness of an intermediate layer (tantalum oxide layer) from 10 to 50 nm without varying a total film thickness of the upper protective layer and the intermediate layer. Also, a signal intensity was satisfactorily high, and deterioration was not substantially recognized.

Example 3

On a polycarbonate substrate, a $(ZnS)_{80}(SiO_2)_{20}$ lower protective layer (95 nm), an $Ag_5In_5Sb_{62}Te_{28}$ recording layer (18 nm), a $(ZnS)_{80}(SiO_2)_{20}$ upper protective layer (40 nm), a Ta intermediate layer (40 nm) and an Ag reflective layer (70 nm) were formed by sputtering method, and a UV ray-curable resin was further coated thereon as a protective coating. Recording and evaluation were carried out in the same manner as in Example 2, and recording was carried out before and after the acceleration test, and 3 T space jitter values were respectively 15.0 nsec and 17.4 nsec, thus proving that deterioration was small. Substantially the same results were obtained with regard to disks prepared by varying a film thickness of an intermediate layer (Ta layer) from 10 to 40 nm. A signal intensity was lower than that of Example 2, but was a satisfactory level.

The solid solubility of Ta to Ag is believed to be 0 atomic %.

Example 4

On a polycarbonate substrate, a $(ZnS)_{80}(SiO_2)_{20}$ lower protective layer (95 nm), an $Ag_5In_5Sb_{62}Te_{28}$ recording layer (18 nm), a $(ZnS)_{80}(SiO_2)_{20}$ upper protective layer (40 nm), a Ni intermediate layer (40 nm) and an Ag reflective layer (70 nm) were formed by sputtering method, and a UV ray-curable resin was further coated thereon as a protective coating. Recording and evaluation were carried out in the same manner as in Example 2, and recording was carried out before and after the acceleration test, and 3 T space jitter values were respectively 15.0 nsec and 15.0 nsec, thus proving that deterioration was very small. Substantially the same results were obtained with regard to disks prepared by varying a film thickness of an intermediate layer (Ni layer) from 10 to 40 nm. A signal intensity was smaller than that of Example 2, but was a satisfactory level.

The solid solubility of Ni to Ag is 0 atomic % and the solid solubility of Ag to Ni is believed to be less than 2 atomic %.

Comparative Example 3

On a polycarbonate substrate, a $(ZnS)_{80}(SiO_2)_{20}$ lower protective layer (95 nm), an $Ag_5In_5Sb_{62}Te_{28}$ recording layer (18 nm), a $(ZnS)_{80}(SiO_2)_{20}$ upper protective layer (40 nm) and an Ag reflective layer (70 nm) were formed by sputtering method, and a UV ray-curable resin was further coated thereon as a protective coating. The same environmental resistance test (acceleration test) was carried out as in Example 2, and there appeared many defects observable by a microscope from the Ag side, and even before the acceleration test, recording properties were deteriorated when recording was repeated about 100 times.

Comparative Example 4

On a polycarbonate substrate, a $(ZnS)_{80}(SiO_2)_{20}$ lower protective layer (95 nm), an $Ag_5In_5Sb_{62}Te_{28}$ recording layer (18 nm), a $(ZnS)_{80}(SiO_2)_{20}$ upper protective layer (40 nm), an Al alloy reflective layer (40 nm) and an Ag reflective layer (70 nm) were formed by sputtering method, and a UV ray-curable resin was further coated thereon as a protective coating. Recording and evaluation were carried out in the same manner as in Example 2, and after the acceleration test, the disk was so deteriorated as not being capable of recording marks. According to Auger electron spectroscopy analysis, it was confirmed that Al and Ag were mutually diffused.

Comparative Example 5

On a polycarbonate substrate, a $(ZnS)_{80}(SiO_2)_{20}$ lower protective layer (105 nm), an $Ag_5In_5Sb_{62}Te_{28}$ recording layer (17 nm), a $(ZnS)_{80}(SiO_2)_{20}$ upper protective layer (50 nm) and an $Al_{99}Ta_1$ alloy reflective layer (220 nm) were formed by sputtering method, and a UV ray-curable resin was further coated thereon as a protective coating. Recording and evaluation were carried out in the same manner as in Example 2, and recording was carried out before and after the acceleration test, and 3 T space jitter values were respectively 11.7 nsec and 30.1 nsec, thus proving that deterioration was quite severe.

Comparative Example 6

On a polycarbonate substrate, a $(ZnS)_{80}(SiO_2)_{20}$ lower protective layer (95 nm), an $Ag_5In_5Sb_{62}Te_{28}$ recording layer (18 nm), a $(ZnS)_{80}(SiO_2)_{20}$ upper protective layer (40 nm), a Ti layer (40 nm) and an Ag reflective layer (70 nm) were formed by sputtering method, and a UV ray-curable resin was further coated thereon as a protective coating. Recording and evaluation were carried out in the same manner as in Example 2, and after the acceleration test, deterioration was so severe that it was impossible to record marks.

This was probably due to mutual diffusion and then alloying of Ag and Ti. The solid solubility of Ti to Ag is about 5 atomic % at an eutectic point of 850° C. However, Ti and Ag form a compound of TiAg.

Comparative Example 7

On a polycarbonate substrate, a $(ZnS)_{80}(SiO_2)_{20}$ lower protective layer (95 nm), an $Ag_5In_5Sb_{62}Te_{28}$ recording layer (18 nm), a $(ZnS)_{80}(SiO_2)_{20}$ upper protective layer (40 nm), a Zr layer (40 nm) and an Ag reflective layer (70 nm) were formed by sputtering method, and a UV ray-curable resin was further coated thereon as a protective coating. The acceleration test was carried out in the same manner as in Example 2, and there appeared many defects visually observable.

Zr and Ag do not form solid solution. However, it is presumed that Zr and Ag formed a compound of ZrAg, probably $Zr_2Ag$ and $Zr_3Ag$.

Comparative Example 8

On a polycarbonate substrate, a $(ZnS)_{80}(SiO_2)_{20}$ lower protective layer (95 nm), an $Ag_5In_6Sb_{63}Te_{26}$ recording layer (18 nm), a $(ZnS)_{80}(SiO_2)_{20}$ upper protective layer (40 nm), a Ge layer (40 nm) and an Ag reflective layer (70 nm) were formed by sputtering method, and a UV ray-curable resin was further coated thereon as a protective coating. The acceleration test was carried out in the same manner as in Example 2, and it visually appeared that the reflective layer was browned. 2 times velocity recording was tried by using a thin disk, but no amorphous marks were formed at all. At a 4 times velocity, amorphous marks were formed when recording was carried out by using shorter pulses than in Example 2. The solid solubility of Ge to Ag is about 9 atomic % at the eutectic point of 651° C.

Example 5

On a polycarbonate substrate having a thickness of 0.6 mm, 205 nm of a lower protective layer $(ZnS)_{80}(SiO_2)_{20}$, 18 nm of a recording layer $Ag_5In_6Sb_{63}Te_{26}$ and 20 nm of an upper protective layer $(ZnS)_{80}(SiO_2)_{20}$ were formed, and $Al_{99.5}Ta_{0.5}$ alloy having a film thickness of 40 nm as a first reflective layer and Ag having a film thickness of 70 nm as a second reflective layer were further formed.

The layers from the upper protective layer to the first reflective layer were formed by sputtering method without breaking vacuum, and after forming the first reflective layer, the multilayered structure was allowed to exposure of the room ambience for 3 days, and the second reflective layer was formed under vacuum again by sputtering method.

After forming the second reflective layer, a UV ray-curable resin was coated as an overcoating layer in a thickness of 4 µm by spin coating method.

Above prepared two disks were adhered, overcoating layers facing each other.

The first reflective layer was formed at a final vacuum degree of not higher than $4 \times 10^{-4}$ Pa under Ar pressure of 0.55 Pa. The volume resistivity was 55 nΩ·m. Impurities such as oxygen, nitrogen, etc. were below the detectable level by X-ray excited photoelectron spectrometry. The sum of all impurities could be regarded as not higher than about 1 atomic %.

The second reflective layer was formed at a final vacuum degree of not higher than $4 \times 10^{-4}$ Pa under Ar pressure of 0.35 Pa. The volume resistivity was 32 nΩ·m. Impurities such as oxygen, nitrogen, etc. were below the detectable level by X-ray excited photoelectron spectrometry. The sum of all impurities could be regarded as not higher than about 1 atomic %.

Figure 6:
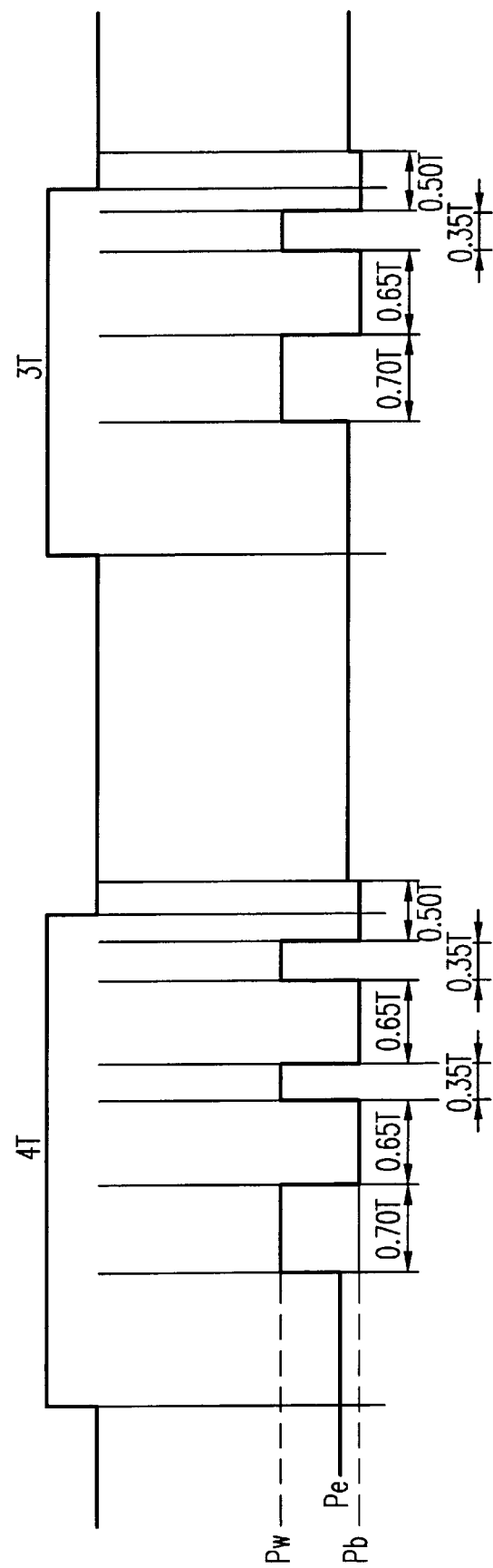
FIG. 6 illustrates another example of recording pulse strategy used in the present invention.

With regard to the above prepared medium, for evaluation of recording/retrieving, an evaluation machine with an optical head of the wavelength of 635 nm and NA of 0.60 was used. By employing the pulse strategy as illustrated in FIG. 6, recording was carried out under a condition of Pe/Pw=0.5, eight-sixteen modulation and 3 T mark length of 0.4 µm, at a linear velocity of 7 m/s (2 times of DVD linear velocity). The recording power dependency of jitter, reflectivity and modulation was shown as an initial value (time 0) in FIG. 7.

This medium also showed jitter of less than 10% at 3.5 m/s and 13 mW by slightly changing the pulse strategy in FIG. 6.

Figure 7A:
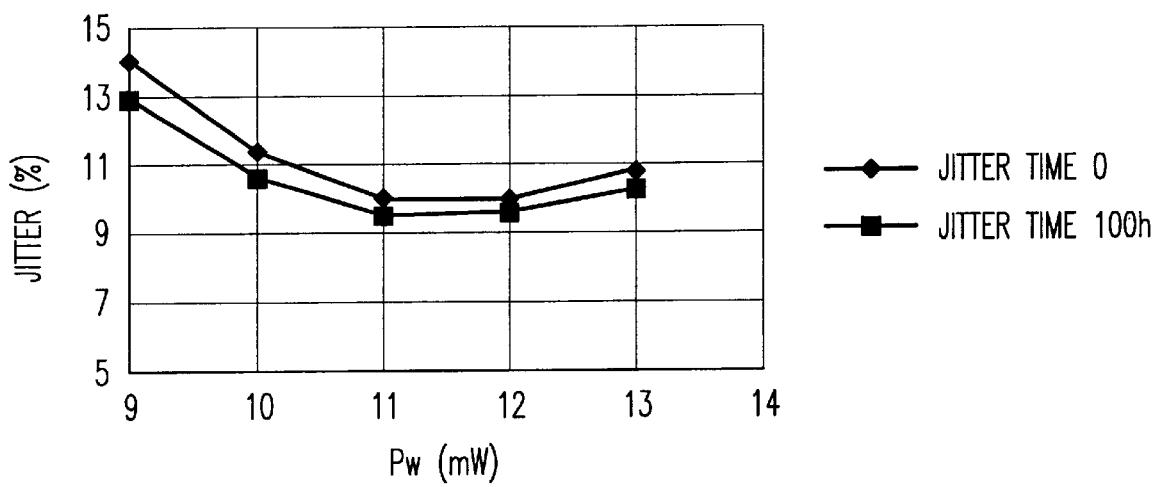
FIG. 7 is a graph illustrating a recording power dependency of jitter, reflectivity and modulation in Example 5.
Figure 7B:
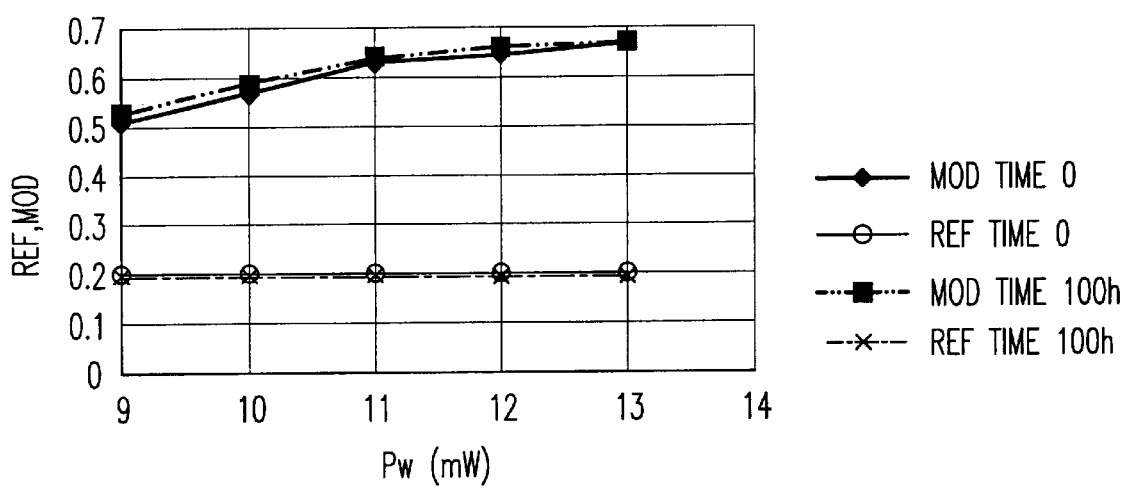

After this disk was allowed to stand for 100 under conditions of a high temperature of 80° C. and a high humidity of 80% RH, recording/retrieving was carried out in the same manner at 7 m/s, and the results were shown as values after acceleration test (time 100 hrs) in FIG. 7. As evident from the results shown in FIG. 7, jitter was not deteriorated at all in the recording power range usually used.

Example 6

On a polycarbonate substrate, a $(ZnS)_{80}(SiO_2)_{20}$ lower protective layer (95 nm), an $Ag_5In_6Sb_{62}Te_{27}$ recording layer (18 nm), a $(ZnS)_{80}(SiO_2)_{20}$ upper protective layer (40 nm), $Al_{99.5}Ta_{0.5}$ alloy reflective layer (40 nm), a Ta layer (40 nm) and an Ag reflective layer (80 nm) were formed by sputtering method, and a UV ray-curable resin was further coated thereon as a protective coating. Recording and evaluation were carried out in the same manner as in Example 1, and a recording power dependency of jitter, reflectivity and modulation was shown as an initial value (time 0) in FIGS. 8 and 9.

Figure 8:
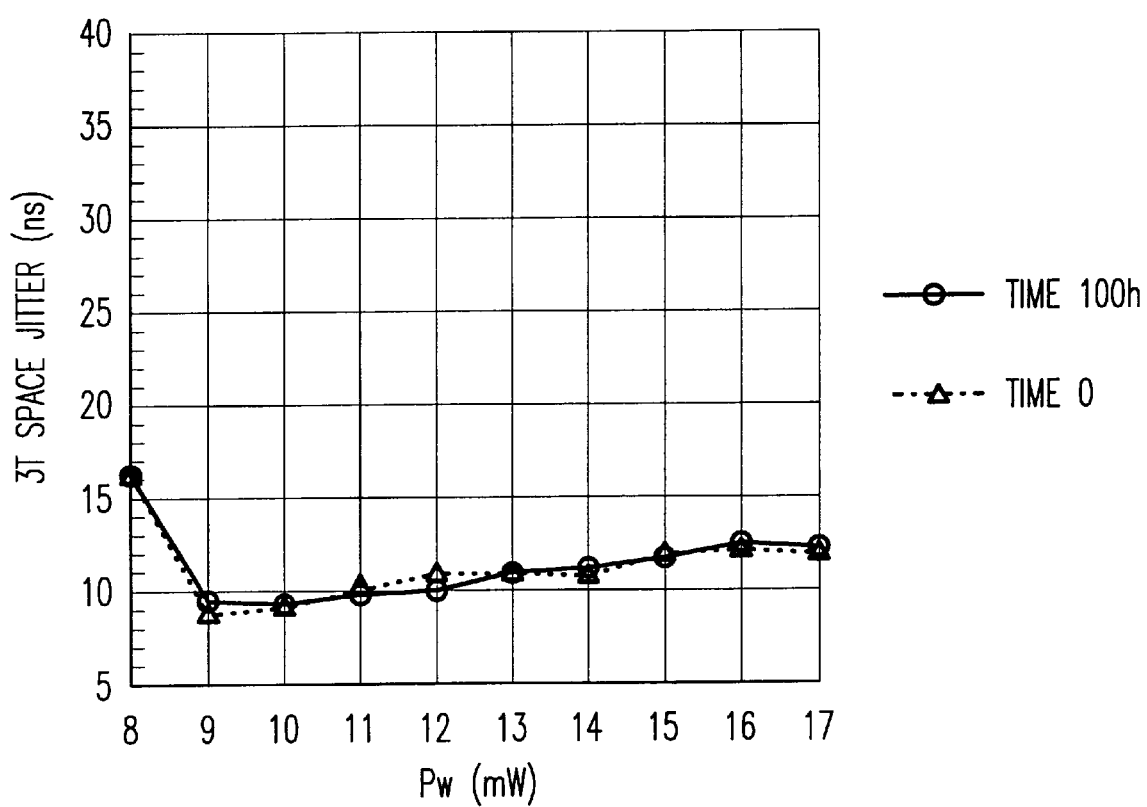
FIG. 8 is a graph illustrating a recording power dependency of jitter in Example 6.
Figure 9A:
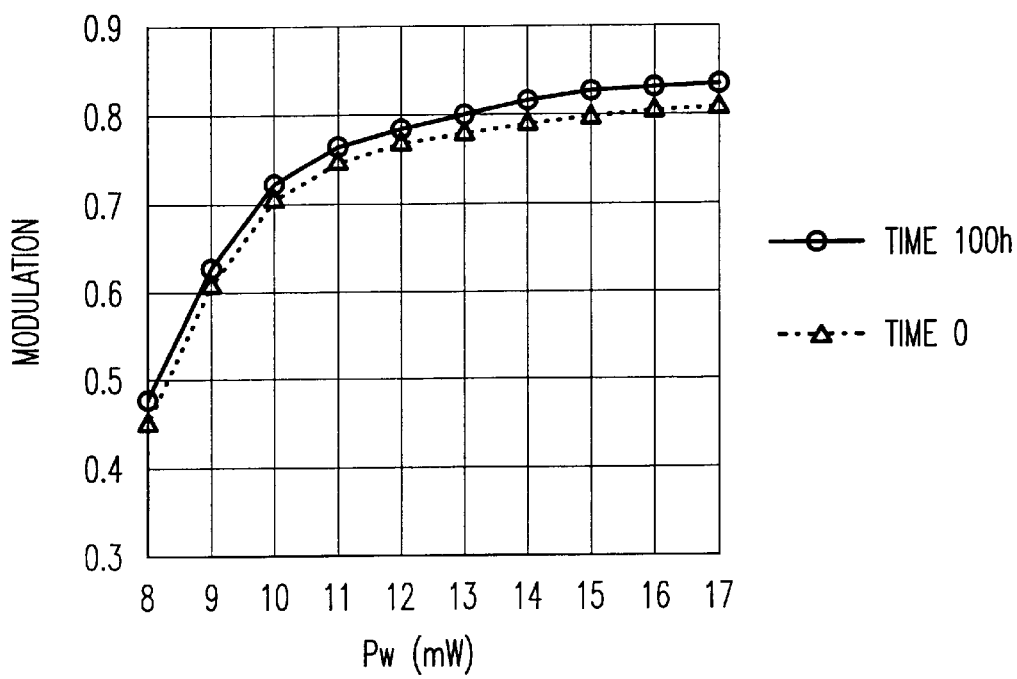
FIG. 9 is a graph illustrating a recording power dependency of reflectivity and modulation in Example 6.
Figure 9B:
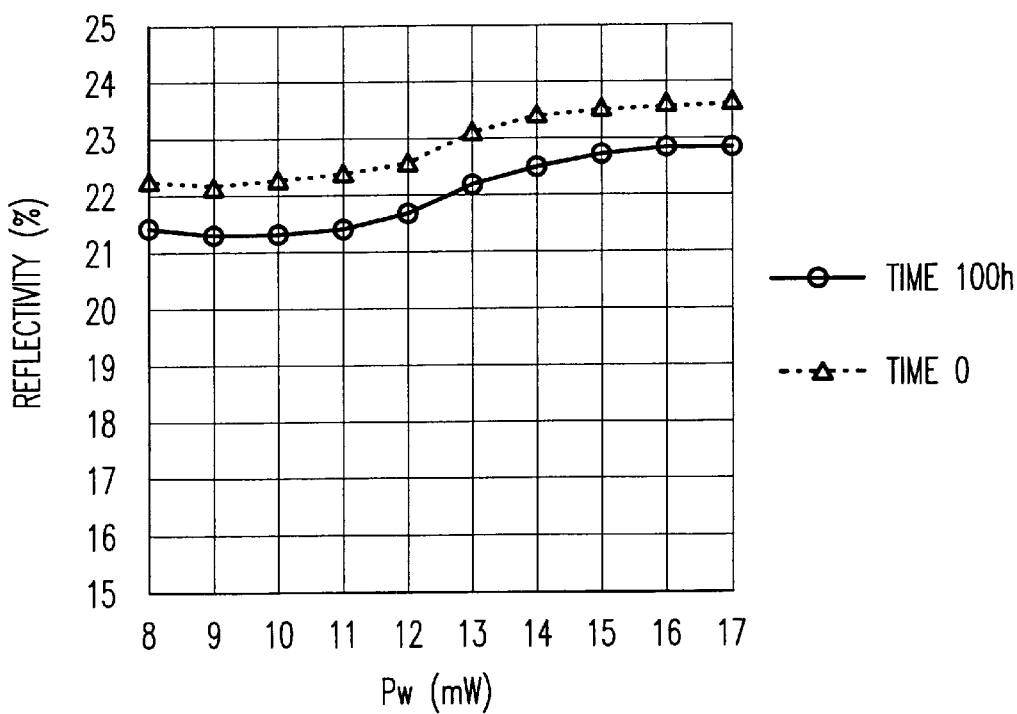

After this disk was allowed to stand for 100 hours under conditions of a high temperature of 80° C. and a high humidity of 80% RH, recording and evaluation were carried out, and the results were shown as values after acceleration test (time 100 hrs) in FIGS. 8 and 9. The solid solubility of Ta to Ag is believed to be 0 atomic %.

Example 7

On a polycarbonate substrate, a $(ZnS)_{80}(SiO_2)_{20}$ lower protective layer (95 nm), an $Ag_5In_6Sb_{63}Te_{26}$ recording layer (18 nm), a $(ZnS)_{80}(SiO_2)_{20}$ upper protective layer (40 nm), an amorphous carbon intermediate layer (40 nm) and an Ag reflective layer (70 nm) were formed by sputtering method, and a UV ray-curable resin was further coated thereon as a protective coating. Recording and evaluation were carried out in the same manner as in Example 2, and recording was carried out before and after the acceleration test and a change of 3 T signal and jitter values were not observed.

The solid solubility of C to Ag is 0 atomic %.

Example 8

On a polycarbonate substrate, a $(ZnS)_{80}(SiO_2)_{20}$ lower protective layer (95 nm), an $Ag_5In_6Sb_{63}Te_{26}$ recording layer (18 nm), a $(ZnS)_{80}(SiO_2)_{20}$ upper protective layer (40 nm), a Co intermediate layer (40 nm) and an Ag reflective layer (70 nm) were formed by sputtering method, and a UV ray-curable resin was further coated thereon as a protective coating. Recording and evaluation were carried out in the same manner as in Example 2, and recording was carried out before and after the acceleration test and a change of 3 T signal and jitter values were not observed.

The solid solubility of Co to Ag is 0 atomic %.

Example 9

On a polycarbonate substrate, a $(ZnS)_{80}(SiO_2)_{20}$ lower protective layer (95 nm), an $Ag_5In_6Sb_{63}Te_{26}$ recording layer (18 nm), a $(ZnS)_{80}(SiO_2)_{20}$ upper protective layer (40 nm), a Cr intermediate layer (40 nm) and an Ag reflective layer (70 nm) were formed by sputtering method, and a UV ray-curable resin was further coated thereon as a protective coating. Recording and evaluation were carried out in the same manner as in Example 2, and recording was carried out before and after the acceleration test and a change of 3 T signal and jitter values were not observed.

The solid solubility of Cr to Ag is 0 atomic %.

Example 10

On a polycarbonate substrate, a $(ZnS)_{80}(SiO_2)_{20}$ lower protective layer (95 nm), an $Ag_5In_6Sb_{63}Te_{26}$ recording layer (18 nm), a $(ZnS)_{80}(SiO_2)_{20}$ upper protective layer (40 nm), a Si intermediate layer (40 nm) and an Ag reflective layer (70 nm) were formed by sputtering method, and a UV ray-curable resin was further coated thereon as a protective coating. Recording and evaluation were carried out in the same manner as in Example 2, and recording of amorphous marks was capable of being carried out after the acceleration test, while a change of reflectivity was observed.

After the acceleration test, there not appeared an alloy forming of the reflective layer with the intermediate layer.

The solid solubility of Si to Ag is 0 atomic %.

Example 11

On a polycarbonate substrate, a $(ZnS)_{80}(SiO_2)_{20}$ lower protective layer (95 nm), an $Ag_5In_6Sb_{63}Te_{26}$ recording layer (18 nm), a $(ZnS)_{80}(SiO_2)_{20}$ upper protective layer (40 nm), a W intermediate layer (40 nm) and an Ag reflective layer (70 nm) were formed by sputtering method, and a UV ray-curable resin was further coated thereon as a protective coating. Recording and evaluation were carried out in the same manner as in Example 2, and recording was carried out before and after the acceleration test and a change of 3 T signal and jitter values were not observed.

After the acceleration test, there not appeared an alloy forming of the reflective layer with the intermediate layer.

The solid solubility of W to Ag is 0 atomic %.

Example 12

On a polycarbonate substrate, a $(ZnS)_{80}(SiO_2)_{20}$ lower protective layer (95 nm), an $Ag_5In_6Sb_{63}Te_{26}$ recording layer (18 nm), a $(ZnS)_{80}(SiO_2)_{20}$ upper protective layer (40 nm), a V intermediate layer (40 nm) and an Ag reflective layer (70 nm) were formed by sputtering method, and a UV ray-curable resin was further coated thereon as a protective coating. Recording and evaluation were carried out in the same manner as in Example 2, and recording was carried out before and after the acceleration test and a change of 3 T signal and jitter values were not observed. After the acceleration test, there not appeared an alloy forming of the reflective layer with the intermediate layer.

The solid solubility of V to Ag is believed to be 0 atomic %.

Example 13

On a polycarbonate substrate, a $(ZnS)_{80}(SiO_2)_{20}$ lower protective layer (95 nm), an $Ag_5In_6Sb_{63}Te_{26}$ recording layer (18 nm), a $(ZnS)_{80}(SiO_2)_{20}$ upper protective layer (40 nm), an Au intermediate layer (40 nm) and an Ag reflective layer (70 nm) were formed by sputtering method, and a UV ray-curable resin was further coated thereon as a protective coating. Recording and evaluation were carried out in the same manner as in Example 2, and recording was carried out before and after the acceleration test and a change of 3 T signal and jitter values were not observed.

After the acceleration test, Au and Ag may form a solid solution. However, Au and Ag form a continuous series of solid solutions, an do not form any specific segregation, which results in no significant change of reflectivity and thermal conductivity.

Example 14

On a polycarbonate substrate, a $(ZnS)_{80}(SiO_2)_{20}$ lower protective layer (95 nm), an $Ag_5In_6Sb_{63}Te_{26}$ recording layer (18 nm), a $(ZnS)_{80}(SiO_2)_{20}$ upper protective layer (40 nm), a Pd intermediate layer (40 nm) and an Ag reflective layer (70 nm) were formed by sputtering method, and a UV ray-curable resin was further coated thereon as a protective coating. Recording and evaluation were carried out in the same manner as in Example 2, and recording was carried out before and after the acceleration test and a change of 3 T signal and jitter values were not observed.

After the acceleration test, Pd and Ag may form a solid solution. However, Pd and Ag form a continuous series of solid solutions, an do not form any specific segregation, which results in no significant change of reflectivity and thermal conductivity.

What is claimed is:

1. An optical information recording medium comprising a substrate, a recording layer, a protective layer containing a sulfur atom, an intermediate layer in contact with the protective layer and a reflective layer containing silver as the main component in contact with the intermediate layer, wherein the intermediate layer comprises an element which does not form a compound with silver, the element contained in the intermediate layer having a solid solubility of at most 5 atomic % to silver and silver having a solid solubility of at most 5 atomic % to the element contained in the intermediate layer, on the side in contact with the reflective layer, and the intermediate layer comprises an element less reactive to sulfur or its sulfide comprises chemically stable elements, on the side in contact with the protective layer, wherein the reflective layer has a silver content of at least 95 atomic %.

2. The optical information recording medium according to claim 1, wherein the reflective layer comprises pure silver or a silver alloy containing at least one component selected from the group consisting of Ti, V, Ta, Nb, W, Co, Cr, Si, Ge, Sn, Sc, Hf, Pd, Rh, Au, Pt, Mg, Zr, Mo and Mn in an amount of from 0.2 atomic % to 2 atomic %.

3. The optical information recording medium according to claim 1, wherein the protective layer contains a sulfide compound.

4. The optical information recording medium according to claim 1, wherein the recording layer comprises an alloy thin film of $Ma_w(Sb_zTe_{1-x})_{1-w}$ wherein $0 \leq w \leq 0.3$, $0.5 \leq z \leq 0.9$ and Ma is at least one component selected from the group consisting of In, Ga, Zn, Ge, Sn, Si, Cu, Au, Ag, Pd, Pt, Pb, Cr, Co, O, N, S, Se, Ta, Nb, V, Bi, Zr, Ti, Mn, Mo, Rh and a rare earth element.

5. The optical information recording medium according to claim 4, wherein $0 \leq w \leq 0.2$.

6. The optical information recording medium according to claim 4, wherein $0.6 \leq z \leq 0.8$.

7. The optical information recording medium according to claim 1, wherein the intermediate layer comprises an element having an eutectic point of at least 500° C. in a binary alloy phase diagram with silver on the side in contact with the reflective layer.

8. The optical information recording medium according to claim 7, wherein the intermediate layer comprises at least one component selected from the group consisting of tantalum, nickel, cobalt, chromium, silicon, tungsten and vanadium on the side in contact with the reflective layer.

9. The optical information recording medium according to claim 8, wherein the intermediate layer comprises at least one component selected from the group consisting of tantalum and nickel on the side in contact with the reflective layer.

10. The optical information recording medium according to claim 1, wherein the intermediate layer comprises an element which does not form a compound with sulfur or a compound with sulfur comprises elements which do not cause decomposition, sublimation, melting and phase transformation at a temperature of not higher than 500° C., in a binary alloy phase diagram with sulfur on the side in contact with the protective layer.

11. The optical information recording medium according to claim 10, wherein the intermediate layer comprises at least one component selected from the group consisting of aluminum, silicon, germanium, tantalum, nickel, cobalt, chromium, tungsten and vanadium on the side in contact with the protective layer.

12. The optical information recording medium according to claim 11, wherein the intermediate layer comprises at least one component selected from the group consisting of aluminum, silicon, germanium, tantalum and nickel on the side in contact with the protective layer.

13. The optical information recording medium according to claim 12, wherein the intermediate layer comprises at least one component selected from the group consisting of aluminum, tantalum and nickel on the side in contact with the protective layer.

14. The optical information recording medium according to claim 1, wherein the intermediate layer comprises at least two layers including a layer containing aluminum as the main component provided in contact with the protective layer and a layer of preventing diffusion of aluminum and silver provided in contact with the reflective layer.

15. The optical information recording medium according to claim 14, wherein the layer of preventing diffusion of aluminum and silver comprises a compound of aluminum or silver with oxygen and/or nitrogen.

16. The optical information recording medium according to claim 15, wherein the layer of preventing diffusion of aluminum and silver comprises a compound of aluminum or silver with oxygen.

17. The optical information recording medium according to claim 14, wherein the layer of preventing diffusion of aluminum and silver comprises at least one component selected from the group consisting of tantalum and nickel.

18. The optical information recording medium according to claim 14, wherein the layer containing aluminum as the main component has an aluminum content of at least 95 atomic %.

19. The optical information recording medium according to claim 18, wherein the layer containing aluminum as the main component comprises pure aluminum or an aluminum alloy containing at least one component selected from the group consisting of Ta, Ti, Co, Cr, Si, Sc, Hf, Pd, Pt, Mg, Zr, Mo and Mn, in an amount of from 0.2 atomic % to 2 atomic %.

20. The optical information recording medium according to claim 1, wherein the intermediate layer comprises at least one component selected from the group consisting of tantalum, nickel, cobalt, chromium, tungsten and vanadium.

21. An optical information recording medium for recording, retrieving and erasing mark length-modulated amorphous marks by irradiating with a focused light beam, which comprises a substrate, a lower protective layer, a phase-change recording layer comprising an alloy thin film of $Ma_w(Sb_zTe_{1-z})_{1-w}$ (wherein $0 \leq w \leq 0.2$, $0.6 \leq z \leq 0.8$ and Ma is at least one component selected from the group consisting of In, Ga, Zn, Ge, Sn, Si, Cu, Au, Ag, Pd, Pt, Pb, Cr, Co, O, N, S, Se, Ta, Nb, V, Bi, Zr, Ti, Mn, Mo, Rh and a rare earth element) having a film thickness of from 10 nm to 30 nm, an upper protective layer having a film thickness of from 30 nm to 60 nm, a first reflective layer containing aluminum as the main component and having a film thickness of from 5 nm to 50 nm, a diffusion-preventing layer in contact with the first reflective layer, and a second reflective layer containing silver as the main component and having a volume resistivity of from 20 nΩ·m to 80 nΩ·m and a film thickness of from 40 nm to 200 nm in contact with the diffusion-preventing layer.

22. The optical information recording medium according to claim 21, wherein the first reflective layer has a volume resistivity of from 20 nΩ·m to 150 nΩ·m.

23. An optical information recording medium comprising a substrate, a recording layer, a protective layer containing a sulfur atom, an intermediate layer in contact with the protective layer and a reflective layer containing silver as the main component in contact with the intermediate layer, wherein the intermediate layer comprises an element which forms a continuous series of solid solutions with silver, wherein the reflective layer has a silver content of at least 95 atomic %.

24. An optical information recording medium comprising a substrate, a recording layer, a protective layer containing a sulfur atom, an intermediate layer in contact with the protective layer and a reflective layer containing silver as the main component in contact with the intermediate layer, wherein the intermediate layer comprises amorphous carbon or an oxide, a nitride or a carbide of a semiconductor or metal, wherein the reflective layer has a silver content of at least 95 atomic %.

25. An optical information recording medium comprising a substrate, a recording layer, a dielectric protective layer, an intermediate layer, and a reflective layer containing silver as the main component in contact with the intermediate layer, wherein the intermediate layer comprises at least one component selected from the group consisting of tantalum oxide, tantalum and nickel, wherein the reflective layer has a silver content of at least 95 atomic %.

26. The optical information recording medium according to claim 25, wherein the dielectric protective layer is a layer comprising ZnS—SiO$_2$ as the main component, and the intermediate layer comprises tantalum oxide, and the reflective layer comprises silver as the main component.

27. The optical information recording medium according to claim 25, wherein the intermediate layer comprises at least two layers including a layer containing aluminum as the main component provided in contact with the protective layer and a layer comprising tantalum or nickel provided in contact with the reflective layer.

28. The optical information recording medium according to claim 25, wherein the intermediate layer comprises a layer comprising an aluminum alloy containing tantalum in an amount of from 0.1 atomic % to 2 atomic % and having a film thickness of from 5 nm to 50 nm and a layer comprising tantalum having a film thickness of from 5 nm to 50 nm and the reflective layer having a film thickness of from 30 nm to 200 nm.

29. The optical information recording medium according to claim 25, wherein the reflective layer comprises pure silver or a silver alloy containing at least one component selected from the group consisting of Ti, V, Ta, Nb, W, Co, Cr, Si, Ge, Sn, Sc, Hf, Pd, Rh, Au, Pt, Mg, Zr, Mo and Mn in an amount of from 0.2 atomic % to 2 atomic %.

30. The optical information recording medium according to claim 25, wherein the recording layer comprises an alloy thin film of $Ma_w(Sb_zTe_{1-z})_{1-w}$ wherein $0 \leq w \leq 0.3$, $0.5 \leq z \leq 0.9$ and Ma is at least one component selected from the group consisting of In, Ga, Zn, Ge, Sn, Si, Cu, Au, Ag, Pd, Pt, Pb, Cr, Co, O, N, S, Se, Ta, Nb, V, Bi, Zr, Ti, Mn, Mo, Rh and a rare earth element.

* * * * *